US012439199B2

(12) United States Patent
Woodley et al.

(10) Patent No.: US 12,439,199 B2
(45) Date of Patent: Oct. 7, 2025

(54) SOUND BAR FOR DETERRENCE OF ASIAN CARP

(71) Applicant: United States of America as Represented by The Secretary of The Army, Alexandria, VA (US)

(72) Inventors: Christa M Woodley, Vicksburg, MS (US); Marybeth K. Brey, La Crosse, WI (US); John T Behrens, Rock Island, IL (US); Bjorn Z. Boydston, Rock Island, IL (US); Cory D DeLong, Milan, IL (US); Frederick R. Joers, Rock Island, IL (US)

(73) Assignees: UNITED STATES OF AMERICA AS REPRESENTED BY THE SECRETARY OF THE ARMY, Alexandria, VA (US); United States Department of the Interior, Reston, VA (US)

( * ) Notice: Subject to any disclaimer, the term of this patent is extended or adjusted under 35 U.S.C. 154(b) by 163 days.

(21) Appl. No.: 18/126,415

(22) Filed: Mar. 25, 2023

(65) Prior Publication Data

US 2024/0064456 A1 Feb. 22, 2024

Related U.S. Application Data

(60) Provisional application No. 63/324,635, filed on Mar. 28, 2022.

(51) Int. Cl.

| | |
|---|---|
| ***H04R 1/22*** | (2006.01) |
| ***H04R 1/02*** | (2006.01) |
| ***H04R 1/28*** | (2006.01) |
| ***H04R 1/44*** | (2006.01) |

(52) U.S. Cl.
CPC ............ *H04R 1/227* (2013.01); *H04R 1/025* (2013.01); *H04R 1/288* (2013.01); *H04R 1/44* (2013.01)

(58) Field of Classification Search
CPC ........ H04R 1/227; H04R 1/025; H04R 1/288; H04R 1/44
USPC .......................................................... 381/89
See application file for complete search history.

(56) References Cited

U.S. PATENT DOCUMENTS

| | | | | |
|---|---|---|---|---|
| 2012/0274767 A1* | 11/2012 | Hornback .............. | H04R 1/025 381/77 |
| 2016/0094911 A1* | 3/2016 | Kropf ...................... | H04R 1/44 381/334 |
| 2021/0144989 A1* | 5/2021 | Hannum .................. | H04R 3/12 |

* cited by examiner

*Primary Examiner* — Sean H Nguyen
(74) *Attorney, Agent, or Firm* — Brian C. Jones

(57) ABSTRACT

One embodiment is directed to a sound bar for producing engineered acoustic signals for keeping an animal away from one or more specific areas. The sound bar includes: a weldment having a weldment top, a weldment bottom, a front weldment side, and a rear weldment side; a plurality of speakers disposed inside the weldment and spaced from each other; at least one acoustic doppler current profilers (ADCP) disposed inside the weldment; at least one hydrophone disposed inside the weldment; and a mounting mechanism configured to be attached to a discharge lateral, the mounting mechanism including a plurality of bottom supports spaced from each other to support the weldment bottom at a plurality of locations and position the weldment top below a top surface of the discharge lateral and position the rear weldment side adjacent a front side of the discharge lateral.

20 Claims, 25 Drawing Sheets

SOUND BAR FOR DETERRENCE OF ASIAN CARP

CROSS-REFERENCE TO RELATED APPLICATIONS

The application is a nonprovisional of and claims the benefit of priority from U.S. Provisional Patent Application No. 63/324,635, filed on Mar. 28, 2022, entitled SOUND BAR FOR DETERRENCE OF ASIAN CARP, the entire disclosure of which are incorporated herein by reference.

STATEMENT OF GOVERNMENT INTEREST

Under paragraph 1(a) of Executive Order 10096, the conditions under which this invention was made entitle the Government of the United States, as represented by the Secretary of the Army, to an undivided interest therein on any patent granted thereon by the United States. This and related patents are available for licensing to qualified licensees.

BACKGROUND

Field of the Invention

The present invention relates to apparatus and methods of using acoustic signals to deter animals and, more specifically, to using engineered acoustic signals to reduce the spread of invasive carp species.

Description of the Related Art

This section introduces aspects that may help facilitate a better understanding of the invention. Accordingly, the statements of this section are to be read in this light and are not to be understood as admissions about what is prior art or what is not prior art.

The United States Government through a collaboration of the United States Geological Survey and the U.S. Army Corps of Engineers recently installed an underwater acoustic deterrent system (uADS) at Lock and Dam 19, in Keokuk, Iowa, to evaluate how engineered signals may be able to reduce the spread of invasive carp species (including Asian carp). A prior study of the fish community near and in Lock and Dam No. 19 indicated that invasive carps and native fishes commonly use the lock for upstream passage. The invasive carp are considered harmful because they grow quickly and aggressively compete with native fish for food and habitat. The only continuous connection between the Great Lakes and Mississippi River basins is the Chicago Area Waterway System (CAWS) and thus it poses the greatest potential risk for the transfer of aquatic nuisance species.

Currently, and beginning with the installation of an initial electric dispersal demonstration barrier in 2002, a series of additional electric barriers have been installed in the CAWS near Romeoville, Illinois to prevent the movement of Bigheaded carps (bighead carp [*Hypophthalmichthys nobilis*] and silver carp [*H. molitrix*]), hereinafter Asian carp (AC), from the Illinois River into southern Lake Michigan. The electric barriers are one control technology in a broad interagency Asian carp prevention effort. Although the electric barrier system is considered effective as a deterrent to AC, supplemental non-structural deterrents to the electric barrier are highly desired. The use of multiple barrier technologies would likely decrease the probability that AC would move through multiple high head dams and controlled river reaches into the Great Lakes through redundancy. Increasing the number of deterrents would also create a "buffer zone," where AC are nonexistent or in low numbers, thus providing greater confidence in their containment.

Due to the large-scale impacts in the Mississippi River Basin and associated basins, coordinated efforts have prompted research and development management tools reduce AC expansion. Significant work has been done to identify potential biological and physical techniques that are candidates for non-structural deterrents that may serve to discourage the movement of bigheaded carps, while allowing passage of native fish, and allow for commercial shipping to continue without interference or inconvenience caused by a non-structural fish deterrent of any type. One candidate is underwater sound. Previous studies have indicated that both AC species react negatively to sound. Asian carp and other members of the superorder Ostariophysi possess a calcified connection between the inner ear and swim bladder, known as a Weberian apparatus, which enhances their hearing ability. Asian carp have a broader hearing range for freshwater fish, detecting frequencies above 3 kHz as opposed to hearing generalists which tend to be limited to frequencies of 50 Hz to 1 kHz, at relatively high sound intensities (greater than 80 dB re 1 μPa). This hearing range may allow for selectively deterring invasive carps, with few impacts to non-target species. Prior studies have indicated that the bigheaded carp (*Hypophthalmichthys* spp.) will repeatedly respond to complex sound, such as 100 Hp boat motor engine, while many native fish respond little to the signal. In addition to low environment and ecological impacts, underwater acoustics deterrents are minimal risk for humans and navigation safety, and have low costs for installations, and long-term operations and maintenance (O&M).

SUMMARY

The present invention was developed to address the desire for a long-term underwater acoustic deterrent system for use in a riverine system. Multiple factors are considered in achieving effective long-term acoustic deterrents. The use of sound frequencies (Hz), sound pressure levels (SPL, dB re 1 μPa), and speaker design and placement to repel Asian Carp (AC) while preventing injury to native aquatic species are desirable. Also desirable is the determination of the efficacy of acoustic deterrents to contain, herd, and capture AC. For both these elements, it is desirable to assess these acoustic deterrents in the field on motivated fish (spawning, feeding, etc.). Moreover, there is a need to critically evaluate the efficacy of underwater acoustic deterrent technology when deployed on a large scale, such evaluation of the underwater acoustic deterrent to continue over time and as the work broadens in scope (reevaluation), and re-deployment and further testing in new environments or locations, as necessary. Finally, it is further desirable to develop tools that predict movement based on Lock & Dam operations and long-term remote monitoring of fish and acoustic deterrent systems.

An aspect the present invention is directed to an engineered acoustic signal for keeping an animal away from one or more specific areas. The engineered acoustic signal has deterrence stimulus evaluated to maximize effectiveness in keeping animals away from specific areas based on at least one of: ability of the deterrence stimulus to initiate a behavioral response of the animal to keep the animal from the one or more specific areas; duration of the behavioral response; and magnitude of the behavioral response.

In some embodiments, evaluating the deterrence stimulus of the engineered acoustic signal to maximize effectiveness comprises deploying the deterrent acoustic array or engineered acoustic signal in an aquatic environment to deter Asian carp; and observing the behavioral response of the Asian carp which comprises experimentally observing presence or absence of at least one of the following response factors: rapid onset of sound; irregular patterns of sound; sound that increases in amplitude of a frequency range; sound that does not decrease in frequency or loudness; sound that is greater than 140 dB re 1 μPa; and sounds that overlap with the Asian carp's hearing range, which tend to create stronger behavioral responses of the Asian carp.

Another aspect of the invention is directed to a sound bar for producing engineered acoustic signals for keeping an animal away from one or more specific areas. The sound bar comprising: a weldment having a weldment top, a weldment bottom, a front weldment side, and a rear weldment side; a plurality of speakers disposed inside the weldment and spaced from each other; at least one acoustic doppler current profilers (ADCP) disposed inside the weldment; at least one hydrophone disposed inside the weldment; and a mounting mechanism configured to be attached to a discharge lateral, the mounting mechanism including a plurality of bottom supports spaced from each other to support the weldment bottom at a plurality of locations and position the weldment top below a top surface of the discharge lateral and position the rear weldment side adjacent a front side of the discharge lateral.

Another aspect of the invention is directed to a method of producing engineered acoustic signals for keeping an animal away from one or more specific areas. The method comprises: attaching to a discharge lateral using a mounting mechanism, a weldment having a weldment top, a weldment bottom, a front weldment side, and a rear weldment side, the mounting mechanism including a plurality of bottom supports spaced from each other to support the weldment bottom at a plurality of locations and position the weldment top below a top surface of the discharge lateral and position the rear weldment side adjacent a front side of the discharge lateral; disposing a plurality of speakers inside the weldment which are spaced from each other; disposing at least one acoustic doppler current profilers (ADCP) inside the weldment; and disposing at least one hydrophone inside the weldment.

BRIEF DESCRIPTION OF THE DRAWINGS

Embodiments of the invention will become more fully apparent from the following detailed description, the appended claims, and the accompanying drawings in which like reference numerals identify similar or identical elements.

DETAILED DESCRIPTION

Figure 1:
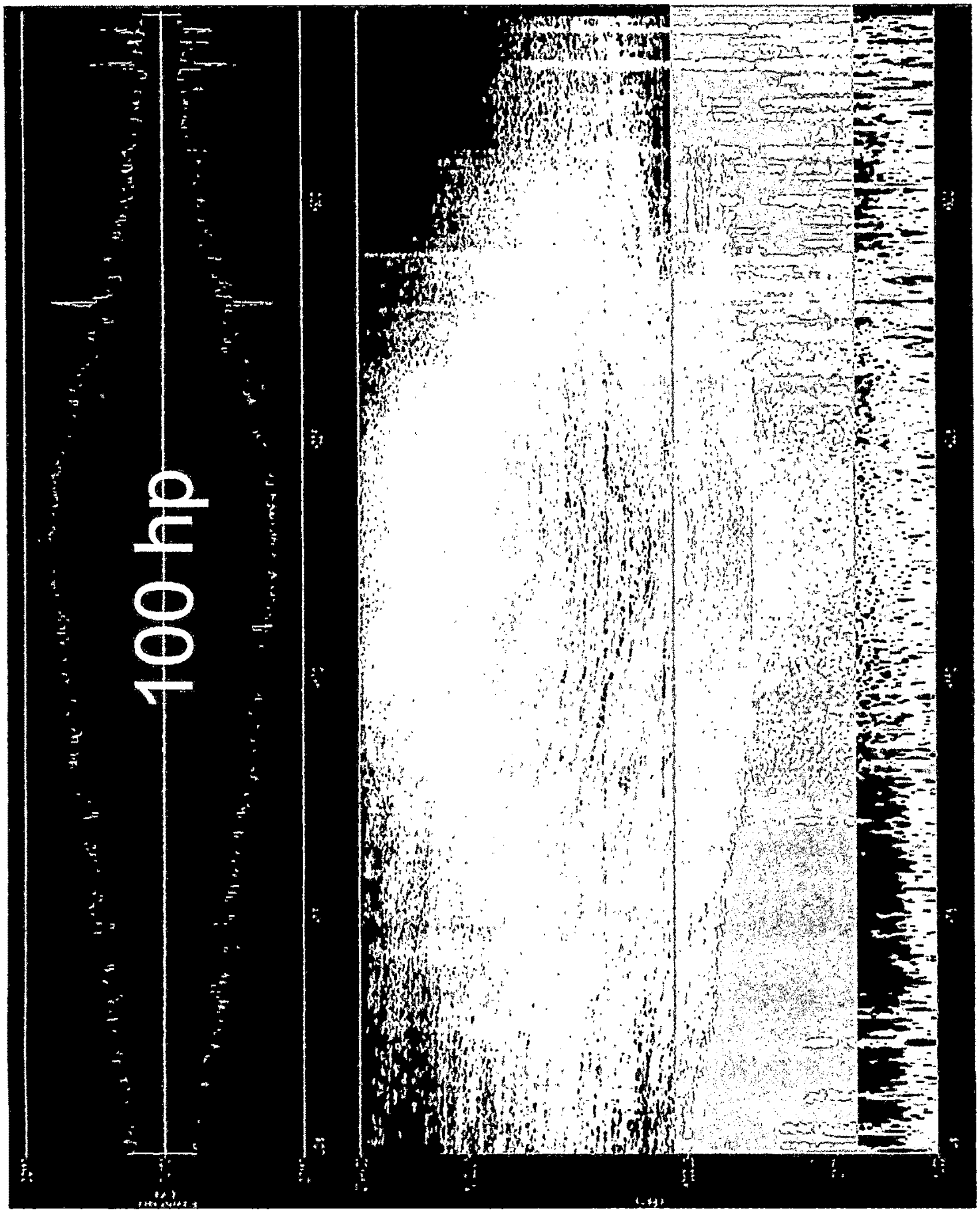
FIG. 1 illustrates an example of a 100 hp signal.

Detailed illustrative embodiments of the present invention are disclosed herein. However, specific structural and functional details disclosed herein are merely representative for purposes of describing example embodiments of the present invention. The present invention may be embodied in many alternate forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Embodiments of the present invention provide long-term underwater acoustic deterrent system and method to repel Asian Carp (AC), while preventing injury to native aquatic species. Research has been conducted to determine the efficacy of acoustic deterrents to contain, herd, and capture AC. The research critically evaluates the efficacy of underwater acoustic deterrent technology when deployed on a large scale. The research has led to embodiments of designed deterrent acoustic array, which provide an effective deterrence for repelling AC. The mechanism of deployment may be an underwater sound transmission and amplification apparatus.

Development of an Acoustic Propagation Model

An important initial step in the process of deploying engineered signals into an aquatic environment is the development of an acoustic propagation model suitable for, e.g., a particular Lock & Dam. Such a propagation model may be used for similarly designed locks, with modifications, to effect re-deployment of engineered signals in additional locations and minimize future efforts and associated cost in Lock sound propagation characterization. To this end, in developing the systems and methods of generating and deploying engineered signals into an aquatic environment: (i) the output of the sound projector array elements and interaction between elements are measured; (ii) the ambient levels of sound in the approach channel of the subject Lock & Dam are measured; (iii) the sound propagation in subject Lock and Dam approach channel is measured; (iv) a determination of the appropriate classes of propagation model(s) to use at the subject Lock & Dam is completed; and (v) an acoustic propagation model is developed for the subject Lock & Dam approach channel using the model that best predicted the collected data.

Projector performance testing is conducted to ensure that all equipment (cables, connectors, speakers, amplifiers) meet vendor specifications. Projectors are designed to produce sound within specified frequency bands. Matching the sound producing capabilities of the projectors to the desired sounds and propagation of those sounds is paramount to success of the sound production system. The system produces the required sound levels in the needed frequency bands with acceptable power consumption and functional lifetime. In addition, beam pattern forming from the speakers are measured to examine and evaluate any distance needed between speakers to reduce transmission losses. When sounds combine, the phase of the sound is important. In phase, sounds add constructively; out of phase they add destructively, forming a beam. By adjusting the phase, beams can be steered. Sound waves interact with their environment, so consideration is given to distance from a sound source. Small distances from the sound source have low or no interaction, while conical spreading occurs at greater ranges. Reflected sound rays interact in a similar fashion to surface water waves reflecting from a pool wall. The Lock & Dam environment may comprise cement on three sides and water on the fourth side. Accordingly, the approach lock becomes a highly reflective domain which may lead to increased transmission loss. Projector array designs implicate interference patterns from the beam forming sources and should be taken into consideration for a particular engineered channel configuration. Additional projector array design considerations are ambient noise, native and invasive fish hearing, coverage, obstructions, and sound profiles & sound levels.

It is desirable in evaluating and designing a particular array for a specific Lock & Dam location to add an additional vessel and swivel arms on each vessel to accommodate navigation thereby having mobile sound and playback vessels, as opposed to having one vessel recording sound from the lock doors down the channel. Various fixed sound receiver locations may be selected where ambient and playback sounds (e.g., engineered tones) are monitored, e.g., over a 7-day period; and as stated using 2 vessels, 2 projectors, and several hydrophones may be placed on the vessel and along the channel to capture sound in 3D and particle motion. Multiple source locations are desirable (e.g., 10-15 source locations) or in certain embodiments of the invention, 12 source locations may be used.

A 3D Parabolic Model with range-dependent parameters (i.e., sediment characteristics, bathymetry) and out-of-plane reflections may be used to model transmission loss at a Lock & Dam location. Decibel loss (dB)—that is transmission loss (TL)—is largely if not entirely due to the reflective surfaces in the Lock & Dam environment. Study of this phenomena in connection with developing an acoustic model in accordance with embodiments of the invention shows that such loss is greater at 3500 Hz when compared to 500 Hz because of the refraction of sound and shorter wavelength at 3500 Hz.

Many configurations are possible with respect to the manner in which engineered signals may be deployed in a Lock & Dam environment. In embodiments of the invention, there may be a first speaker array comprising 2 rows having speakers spaced 10' apart and rows spaced 20' apart. In further embodiments of the invention a second speaker array may comprise 12 speaker rows having speakers spaced 10' apart and rows spaced 20' apart. The number of speakers may be reduced without impacting coverage in embodiments of the invention by using engineered signals that have limited frequency and amplitude range, and speakers may be redesigned to increase amplitude and ability to spread sound. In embodiments of the invention speaker arrays may be designed to provide coverage to a mix of walls and floor surfaces.

Development of test tones for a particular Lock & Dam Sound propagation model may include using a signal that covers the hearing range of Asian carp (0 Hz to 8000 Hz) and overlapped with the 100 Hp playback.

Examination of 100 HP Outboard Motor Playback

FIG. 1 illustrates an example of a 100 hp signal. The use of a 100 hp outboard motor (e.g., 100 hp Yamaha 4-stroke) and boat travelling 32 km/hr past an HTI-96-min hydrophone at a nearest distance of 10 m playback sound has been investigated by Murchy et al. 2016 & 2017 and Vetter et al. 2016, 2017, and 2018. See, e.g., Vetter, Brooke J., and Allen F. Mensinger. "Broadband sound can induce jumping behavior in invasive silver carp (*Hypophthalmichthys molitrix*)." *Proceedings of Meetings on Acoustics 4ENAL*. Vol. 27. No. 1. Acoustical Society of America, 2016; Brooke J. Vetter, Kelsie A. Murchy, Aaron R. Cup, Jon J. Amberg, Mark P. Gaikowski, and Allen Mensinger, "Acoustic Deterrence of Bighead Carp (*Hypophthalmichthys Nobilis*) to a Broadband Sound Stimulus," Journal of Great Lakes Research, Vol. 43, Issue No. 1, pages 163-171, doi: 10.1016/j.jglr.2016.11.009 (1 Feb. 2017); Vetter, Brooke J., Robin D. Calfee, and Allen F. Mensinger. "Management implications of broadband sound in modulating wild silver carp (*Hypophthalmichthys molitrix*) behavior." *Management of Biological Invasions* 8.3 (2017): 371-376, doi.org/10.3391/mbi.2017.8.3.10; K. A. Murchy, A. R. Cupp, J. J. Amberg, B. J. Vetter, K. T. Fredricks, M. P. Gaikowski, and A. F. Mensinger, "Potential Implications of Acoustic Stimuli as a Non-Physical Barrier to Silver Carp and Bighead Carp," doi.org/10.1111/fme.12220 (22 May 2017); and Kelsie A. Murchy, Brooke J. Vetter, Marybeth K. Brey, Jon. J. Amberg, Mark P. Gaikowski, and Allen F. Mensinger, "Not All Carps are Created Equal: Impacts of Broadband Sound on Common Carp Swimming Behavior," Proceedings of Meetings on Acoustics, Vol. 27, 010032, pages 1-9 (2017), Fourth International Conference on the Effects of Noise on Aquatic Life, Dublin, Ireland (10-16 Jul. 2016) doi.org/10.1121/2.0000314; Vetter, Brooke J., Marybeth K. Brey, and Allen F. Mensinger. "Reexamining the frequency range of hearing in silver (*Hypophthalmichthys molitrix*) and bighead (*H. nobilis*) carp." *PLoS One* 13.3 (2018): e0192561.

The characterization is 35 s in duration, frequency range of 10 Hz to 23,999 Hz, an amplitude that increases from 0.15V to 1V and returns to 0.18V, asymmetric between two channels, and the second channel has a digital signature of filtration. As may be studied in connection with long-term ambient spectra, a majority of energy in over a 7-day period at a selected Lock & Dam may be between 60 and 1000 Hz. This includes the ambient noise generated by water movement around the hydrophone (e.g., splashing), local biologically produced sounds, and nearby transportation noise. The majority of power (dB re 1 μPa) of the 100 hp signal is in the frequency range (100-1000 Hz) which overlaps with most native and non-native species hearing sensitivities. In addition, the noise produced by some commercial vessels commonly using lock approaches also has the greatest power in the (10-1000 Hz). It would be desirable to produce signals where the majority of the sound wave (time per frequency) was outside of this frequency range, or with specific patterns within it, so that any generated engineered signal does not have to be "louder" than navigation, i.e., a commercial tow. The loudest section of the 100 hp playback signal would be masked by passing tows (based on long-term spectra for the selected Lock & Dam configuration).

This research includes analysis of ambient noise generated by navigation. As may be shown in a detailed study of sound generated by navigation at a Lock & Dam location, the main sound generation elements (opening lock doors, draining the lock, tow vessel noise) have a majority of energy (loudness; dB re 1 μPa) in the 100-1000 Hz range (x-axis).

Development of Novel Engineered Signals to Deter Invasive Carp

Knowing the range and thresholds of invasive carp hearing is critical to define "effective" sound playbacks that will elicit behavioral responses for the acoustic deterrent array. Phonotaxis (movement of an organism in relation to a sound source) is response that implies the sound used to elicit the response was within the hearing range of the fish. The lack of phonotaxis, however, does not mean that the fish could not hear the cue. Not all acoustic cues will initiate a behavioral response, and some may initiate a range of responses from subtle movements that are transient to more intense movements. Salient movements and movement patterns provide spatio-temporal information needed to design deterrent arrays and maximize their effectiveness in keeping animals away from specific areas. Three elements are critical when evaluating deterrence stimuli: 1) the ability of the stimulus to initiate a behavioral response, 2) the duration of the behavioral response, and 3) the magnitude on the behavioral response.

Informing the invention of engineered signals to deploy in aquatic environments to deter invasive carp included several experimentally observed response factors: Bighead carp respond to (1) rapid onset of sound, (2) irregular patterns of sound, (3) sound that increases in amplitude of a frequency range, (4) sound that does not decrease in frequency or loudness, (5) sound that is greater than 140 dB, and (6) sounds that overlap in the upper and lower ends of their hearing which tend to create stronger responses. Also, other inventive factors are contemplated in the discovery of engineered signals effective to deter Invasive Carp (IC). While certain sounds may initially appear to be promising, there may be a queue for the IC to return back to normal behavior by which is meant they are ultimately not deterred.

The evaluation of the specific hearing range of the individual IC species (in other words, what engineered signals are audible to a certain or all species of invasive carp to be deterred) is a factor, i.e., certain sounds may be more effective to deter certain species of invasive carp due to their hearing range or other undetermined factors.

Further, if effective sounds are discovered but are masked by navigation sounds or noises, as discussed above, it may be possible to create an engineered signal that is increased in decibels in the appropriate frequency range such that it may still act so as to deter the invasive carp. Attention is given to the possibility that invasive carp may habituate or "adapt" to the navigation background noise patterns present in the given environment.

It has been unexpectedly discovered that invasive carp may be susceptible to the Doppler like-effect, wherein if the sound is perceived to be approaching the invasive carp may be deterred, but a sound that is perceived as receding or increasing in distance from the fish may not be perceived as a threat and therefore not an effective deterrent or not as effective as approaching sound. "Doppler-like effect" is described as a noticeable gain and drop of pitch as noise as it approaches and passes by the subject or the carp.

While some studies of the 100 hp outboard motor have included as a part of the recorded sound pattern of splashing originating in all probability from wave action on the recording platform or raft, water lapping and splashing noises are not a component of the engineered signals in accordance with the invention. The primarily reason for exclusion is that when invasive carp forage, they may "roll" on the surface of the water, creating water lapping or splashing sounds. Water lapping, and splashing, then, could scare fish but it also could excite fish thus resulting in a misinterpretation of the engineered signal intent.

A quantitative measure of deterrence has been developed called "distance travelled" and measured in units of length, e.g., cm. It is an indication of how far an invasive carp will continue to travel when subjected to a sound. The 100 hp outboard motor sound pattern believed to be somewhat effective and studied, as indicated and discussed above, has a rejection rate of 110,000 cm which includes fish behavior where fish do not reverse direction and may even return to their prior direction of travel.

In a surprising and unexpected discovery, the engineered signals according to embodiments of the present invention have a dramatically improved distance travelled of 20,000 cm or less, which is over five times better than the 100 hp outboard motor sound pattern. Additionally, the observed behaviors of the fish when subjected to the engineered signals in accordance with embodiments of the invention include possible reversal of direction, freezing, or seeking shelter.

Figure 2:
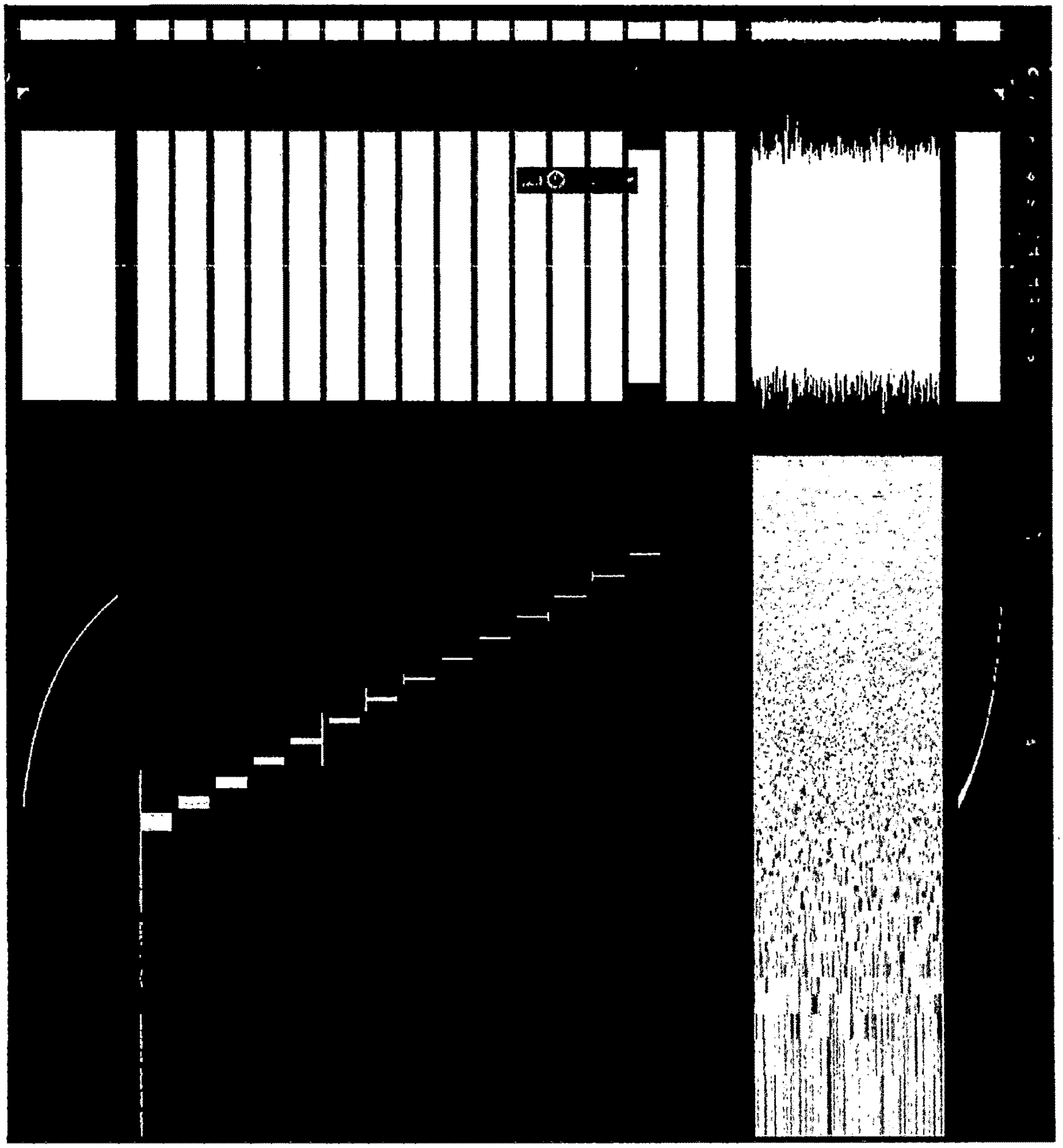
FIG. 2 illustrates an example of field engineered test tones used for examining the function of a transducer (hydrophone or speaker) across a frequency pattern and developing a baseline of sound as it propagates through an area.

FIG. 2 illustrates an example of field engineered test tones used for examining the function of a transducer (hydrophone or speaker) across a frequency pattern and developing a baseline of sound as it propagates through an area. The pure tones cover a broad frequency band range, while maintaining a relative loudness (dB). The upper graph provides voltage of the signal (y-axis) of the time of the signal (x-axis). The lower graph shows the pure tones in Hz (y-axis), time (x-axis), and the color intensity a voltage correlated to the upper graph.

Figure 3:
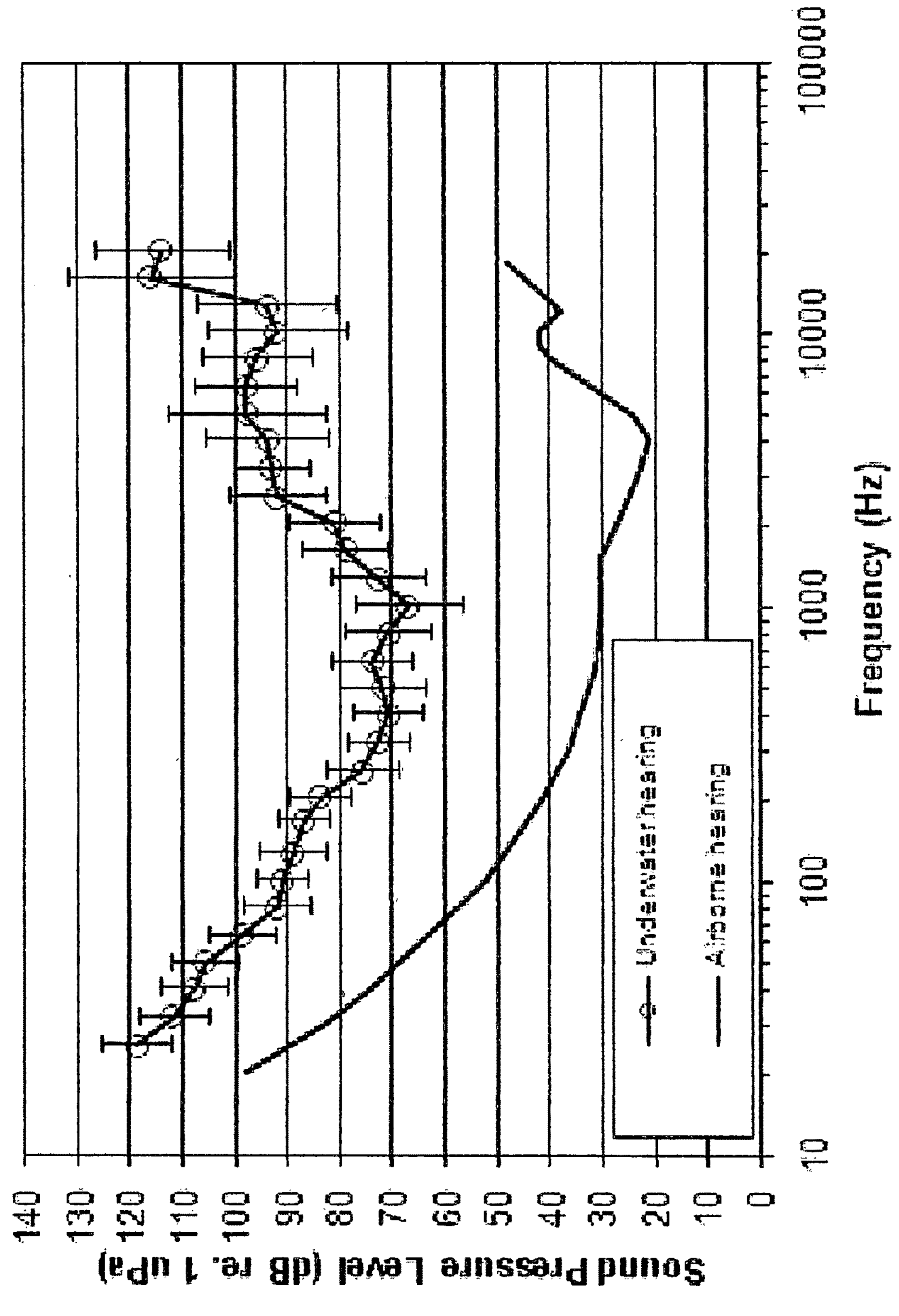
FIG. 3 illustrates an example of a graph of sound pressure level as a function of frequency illustrating human hearing audiogram in air and in water.

FIG. 3 illustrates an example of a graph of sound pressure level as a function of frequency illustrating human hearing thresholds in air and in water. http://resource.npl.co.uk/docs/science technology/acoustics/clubs_groups/13oct05 seminar/parvin_subacoustech.pdf. The graph shows comparison of human Minimum Audible Field (MAF) airborne and underwater hearing threshold. See S J Parvin and J R Nedwell, "Underwater Sound Perception and the Development of an Underwater Noise Weighting Scale," Underwater Technology, Vol. 21, No. 1, pages 12-19 (1995), oi.org/10.3723/175605495783328836; S J Parvin, E A Cudahy, and D M Fothergill, "Guidance for diver exposure to underwater sound in the frequency range from 500 to 2500 Hz," Proceedings of Undersea Defense Technology, La Spezia, Italy (2002).

Figure 4:
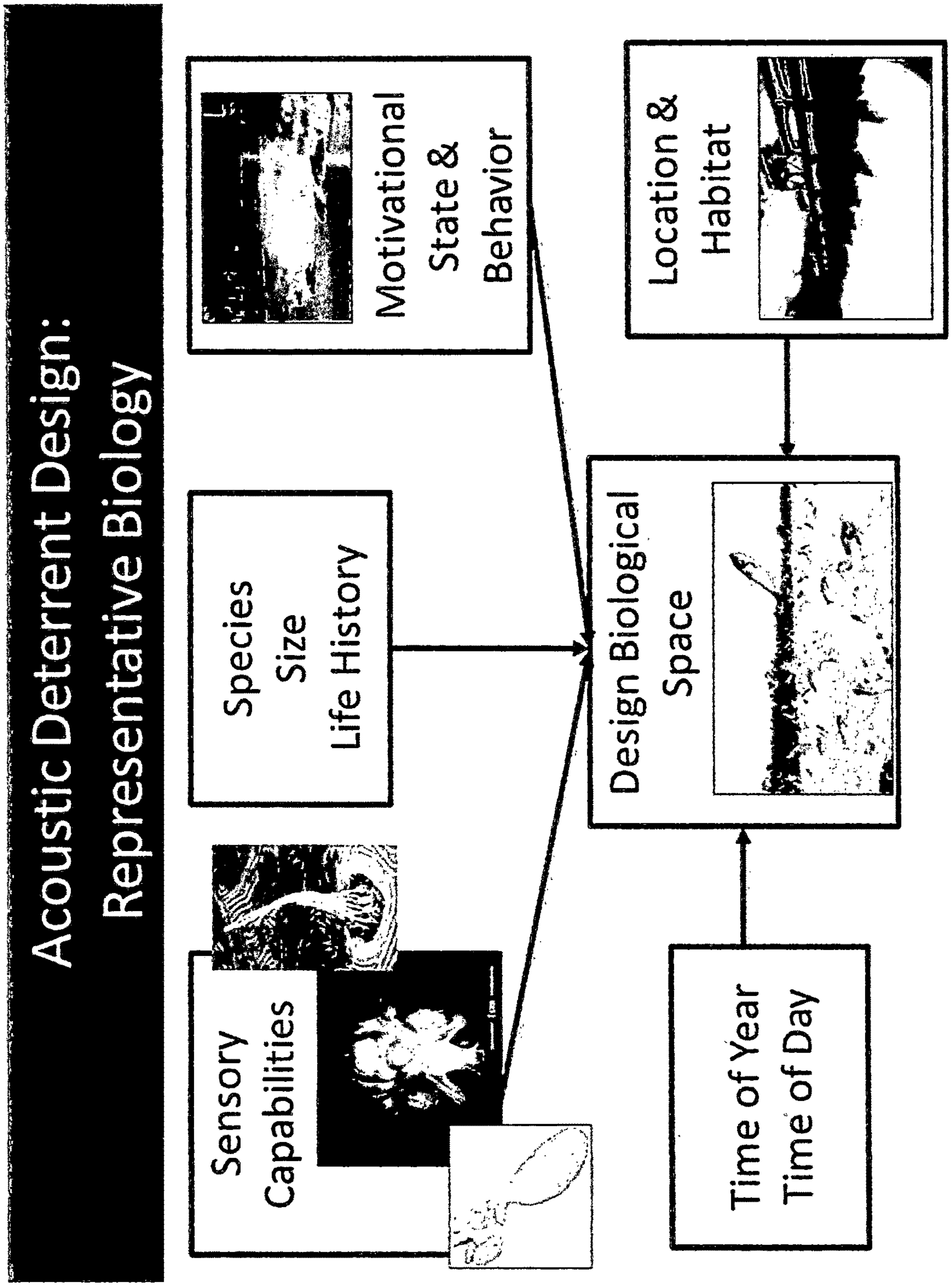
FIG. 4 shows an example of a diagram illustrating acoustic deterrent design with representative biology.

FIG. 4 shows an example of a diagram illustrating acoustic deterrent design with representative biology. It describes underwater animals' behavior in relation to environmental acoustics. To understand underwater animals' behavioral responses to environmental acoustics, one assumes that all responses are dependent upon several factors including, for example, prior exposure (habituation vs. sensitization) to the stimuli, location & habitat, sensor capabilities, current sound exposure level/sound pressure levels, motivational state at time of exposure (i.e., spawning, hunger, injury, illness, etc.), and species size & life history (age, gender, and health). Using criteria of this nature allows one to design a representative biological space that represents a percentage of a family or species population of interest that is likely to respond to a noise as a statistical quantity due to a full range of behavioral and contextual variables.

Figure 5:
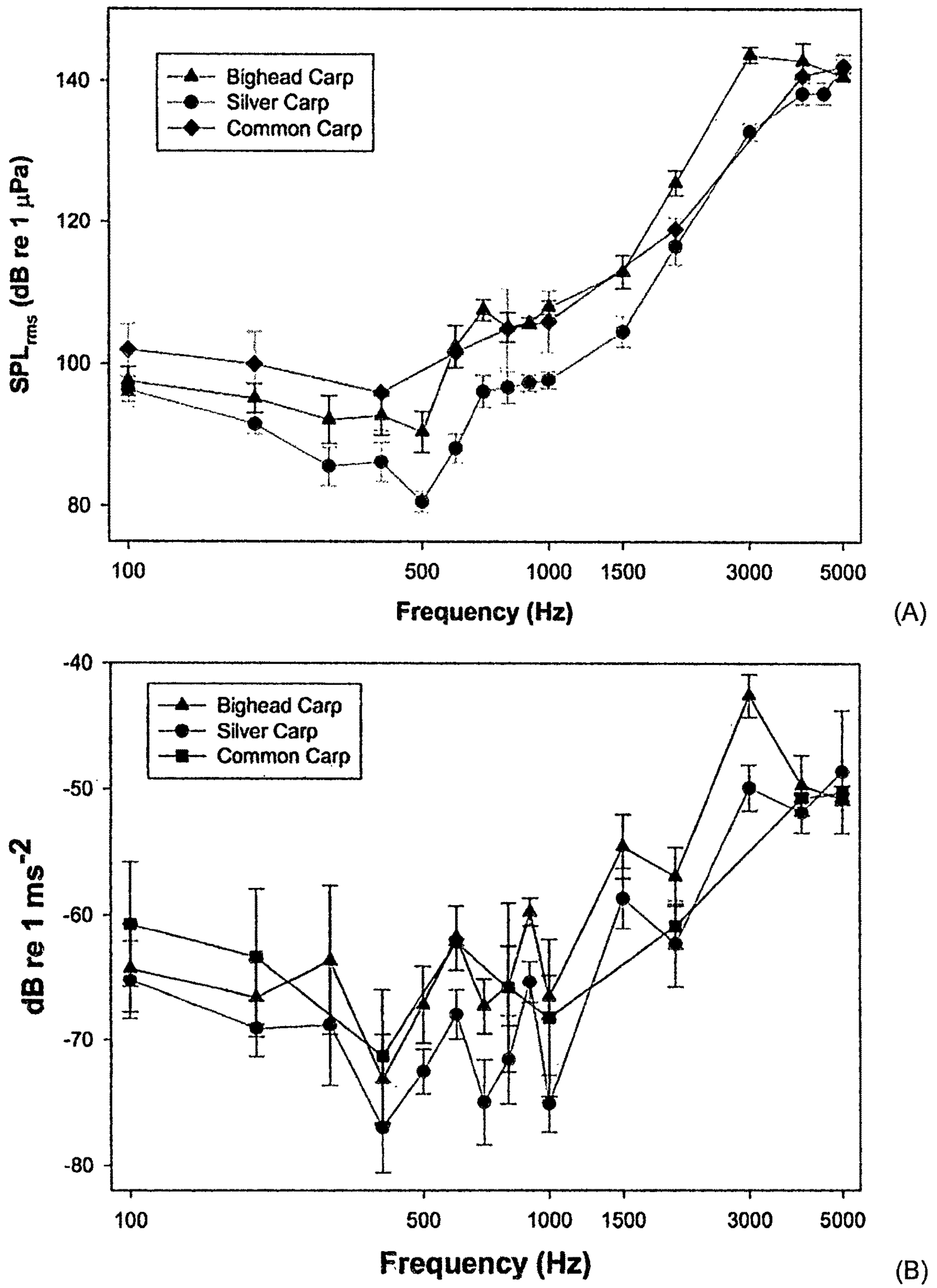
FIG. 5 shows an example of an audiogram and particle acceleration thresholds for bighead carp, silver carp, common carp.

FIG. 5 shows an example of an audiogram and particle acceleration thresholds for bighead carp, silver carp, common carp. doi: 10.1371/journal.pone.0192561. eCollection 2018. In view (A), each data point represents the minimum $SPL_{RMS}$ (dB re 1 μPa) necessary to invoke an AEP (Auditory Evoked Potential) response at each frequency examined (100 Hz-5 kHz). Data are reported as mean (±SD). See Brooke J. Vetter, Kelsie A. Murchy, Aaron R. Cup, Jon J. Amberg, Mark P. Gaikowski, and Allen Mensinger, "Acoustic Deterrence of Bighead Carp (*Hypophthalmichthys nobilis*) to a Broadband Sound Stimulus," Journal of Great Lakes Research, Vol. 43, Issue No. 1, pages 163-171, 10.1016/j.jglr.2016.11.009 (1 Feb. 2017). In view (B), shows the particle acceleration thresholds (dB re 1 $ms^{-2}$) for the bighead, silver, and common carp. Each threshold was derived using a tri-axial accelerometer and are reported as the combined magnitude vector of the x, y, and z-axes Data are reported as mean (±SD).

Figure 6:
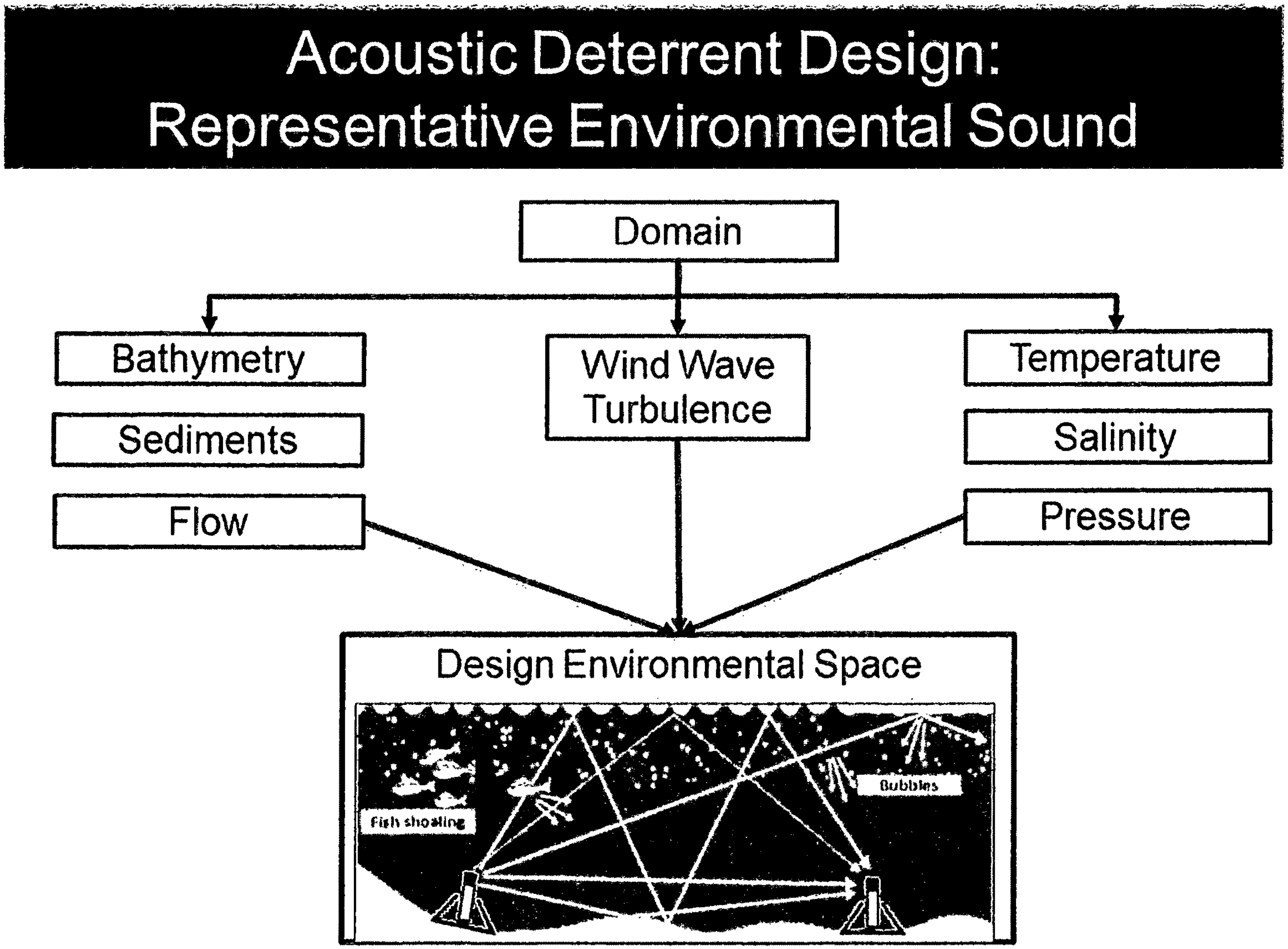
FIG. 6 shows an example of a diagram illustrating acoustic deterrent design with representative environmental sound.

FIG. 6 shows an example of a diagram illustrating acoustic deterrent design with representative environmental sound. It describes environmental sound relative to the area of interest. Several pieces of environmental information are desirable input to design an acoustic array for a lock approach channel: bathymetry, benthos characterization, sediments, flow, wind wave turbulence, temperature, pressure, and salinity. To describe the acoustics of an area of interest, the collection of the ambient soundscape is needed—that is, representative samples of naturally occurring and anthropogenic noise. The soundscape should take into consideration sound variation at night, sources of noise, variation within those sources—essentially, any normally expected noise in the region.

Figure 7:
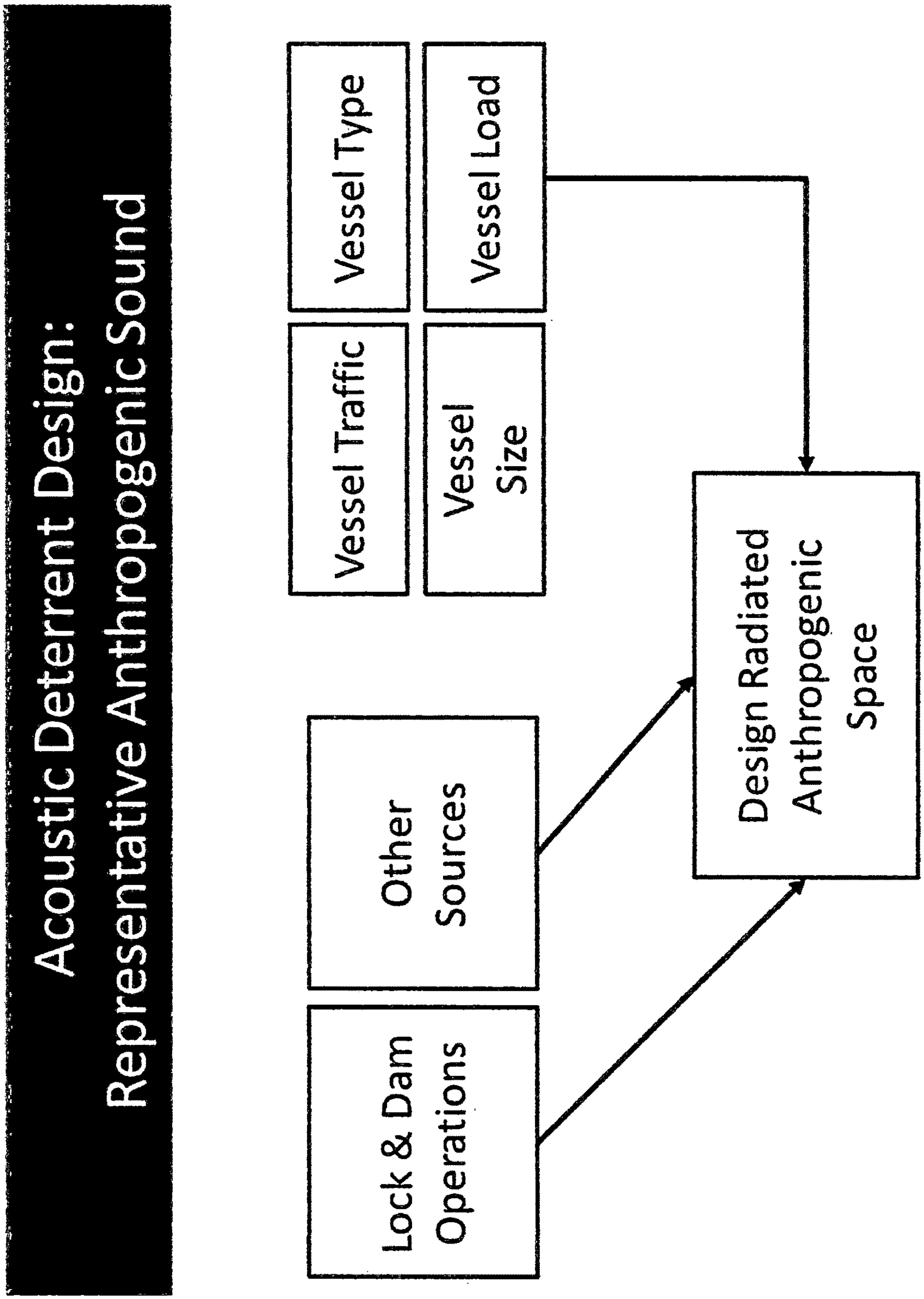
FIG. 7 shows an example of a diagram illustrating acoustic deterrent design with representative anthropogenic sound.

FIG. 7 shows an example of a diagram illustrating acoustic deterrent design with representative anthropogenic sound. It describes anthropogenetic noise. In many study areas, the ambient sound or soundscape now includes that of anthropogenic generated noise. For a selected Lock and Dam, noise generated would include size of vessels, vessel loads, size of barges, barge loads, size of tow, where within the region the tow engine rpms (e.g., acceleration, deceleration, idling), local sources of noise including recreational vessels, trains, planes, bridges, vehicle traffic, vessels, vessel load, lock and dam operations, etc.—essentially, any normally expected noise in the area of interest generated from non-biological sources.

Novel Sound Bar System to Deploy in Lock & Dam Environments to Deter Asian Carp

As referenced above, a recently installed underwater acoustic deterrent system (uADS) at Lock and Dam 19, in Keokuk, Iowa, is being used to evaluate how engineered signals may be able to reduce the spread of Asian carp (AC) species.

In accordance with another aspect of the invention, a novel sound bar device is one of a kind and has been designed to be unique in modularity by which is meant that individual components (such as speakers, amplifiers) may be acquired from various sources, and it is not necessary to have custom-manufactured components. Many vendors offer proprietary technology designs for a cost. A fully functional sound bar device in accordance with an embodiment of the invention is intended to avoid such a need for custom proprietary devices.

The design is such that the sound bar in accordance with embodiments of the invention fits directly and fully across and into the discharge lateral of a Lock & Dam facility. It is extremely durable and able to survive the hazards of normal Lock & Dam operations, navigation, and high-flow river conditions for significant time periods. Barge traffic may have too much draft and can contact portions of the sound bar, the pressure and debris from the propellors of the vessels are known to be damaging, dredge or work platform spuds have been known to be a factor, and any manner of large debris may become entrained or entangles in barge navigation and caused to impact the sound bar in accordance with the invention or even damage to the Lock and Dam structure itself is not uncommon.

Figure 8:
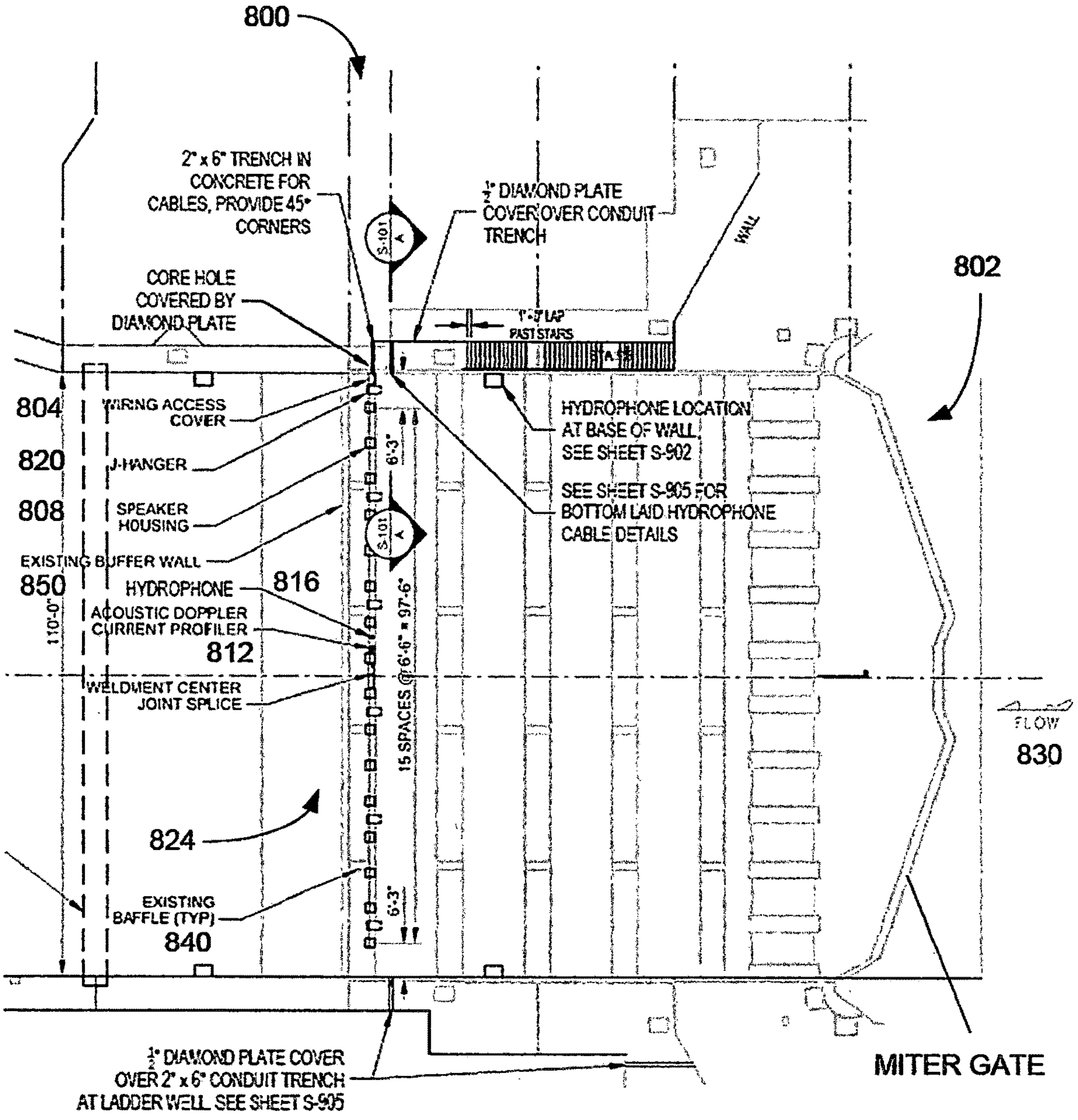
FIG. 8 shows an overhead view of the sound bar placement in the downstream lock approach, 5$^{th}$ discharge lateral, and relative components that include the wiring access cover for wiring to the speakers and the like in a main weldment, where the acoustic doppler current profiler (ADCP) and hydrophone are placed.

FIG. 8 shows an overhead view of the sound bar 800 placement in the downstream lock approach, 5$^{th}$ discharge lateral 802, and relative components that include the wiring access cover 804 for wiring to the speakers and the like in a main weldment, where at least one acoustic doppler current profiler (ADCP) 812 and at least one hydrophone 816 are placed. The J-hangers 820 and the weldment 824 (main body of sound bar 800 for shipping) may be spliced together to reduce shipping costs. The flow arrow 830 indicates the lock approach direction. The main weldment 824 is the main structure that holds the speakers and cabling needed to ensonify the lock approach as determined from the sound mapping conducted prior to design and deployment. The weldment 824 includes a longitudinal structure having a weldment top, a weldment top, a front weldment side, a rear weldment side, and two weldment ends disposed opposite from one another. FIG. 8 also shows the baffle 840 and buffer wall 850.

The design embodies safety and reduction of risks associated with normal lock operations, sound generation, surrounding community, and local ecology. The weldment holds the speakers with materials that meet the following criteria as cited in AISC Steel Construction Manual (14$^{th}$ edition): ASTM A500 FY=46 KSI; ASTM A36, FY=36 KSI, ASTM F1554 Grade 55, FY=55; ASTM A325. The J-hangers 820 are configured to secure the weldment to the top and side of the lateral and allow for the weldment to hang down into the lateral discharge. This reduces the risk of strike by navigation or debris and becoming dislodged causing potentially catastrophic events (loss of life, damage to the lock, and consequently impact on the US economy) at a lock. In addition, the positioning of the weldment deployed in the discharge lateral reduces the transfer of sound through structural mediums (mechanical coupling). Sound transmission into the air rather than the water column is undesirable as more audible noise could disrupt navigation communication (between staff) and add additional noise stress on local communities. An example of a non-desirable location would be speakers placed on miter gates where the energy (in this case sound) would move from the speaker into the miter gate. As the speaker vibrates, the water and the miter gate (and components of the miter gate) would vibrate accordingly. Because the miter gate is both in the water and in the air, the noise would disperse into the air, thus the miter gate transfers noise acting like an in-air speaker. This would directly (or indirectly) create sound that navigation and the public would be able to hear, thereby presenting a potential health hazard. The secondary impacts of mechanical coupling on structures that allow for transfer of energy between water and air mediums could disrupt of navigation communication between operators could result in catastrophic events (loss of life, damage to the lock, and consequently impact on the US economy) at a lock; and likelihood of disruption of the surrounding community and local ecology (such as the overwintering of bald eagles long the buffer zone of the train tracks and lock facility). This design reduces these risks by placement of the soundbar in water column, below a depth where vessels could strike it (assuming these abide by draft regulations), in a location and on materials that reduce the likelihood of mechanical coupling, and thus, reduces the sound transfers into air.

Figure 9:
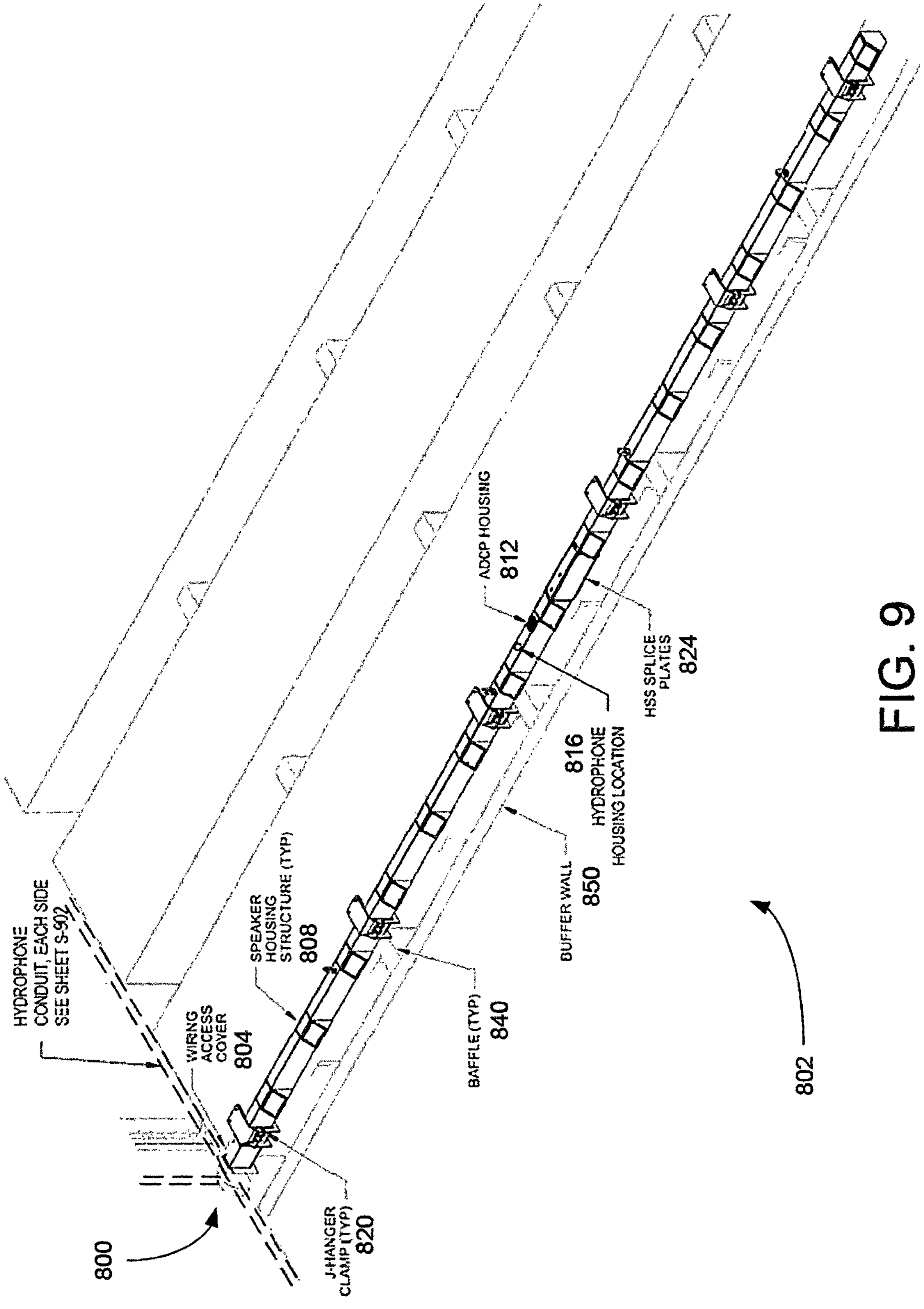
FIG. 9 shows an overhead angled view of the sound bar placement in the downstream lock approach, 5$^{th}$ discharge lateral, and relative components that include the wiring access cover for the speaker housing, where the ADCP and hydrophone are placed, and J-hangers.

FIG. 9 shows an overhead angled view of the sound bar 800 placement in the downstream lock approach, 5$^{th}$ discharge lateral 802, and relative components that include the wiring access cover 804 for the speaker housing 808, where the ADCP 812 and hydrophone 816 are placed, and J-hangers 820. Baffle type 840 and buffer wall 850 are attributes inherent to the lock structure.

This design embodies the need to ensonify the lock approach with the engineered deterrence signals for the AC deterrence, but also the area below the discharge lateral where fish can congregate.

Figure 10:
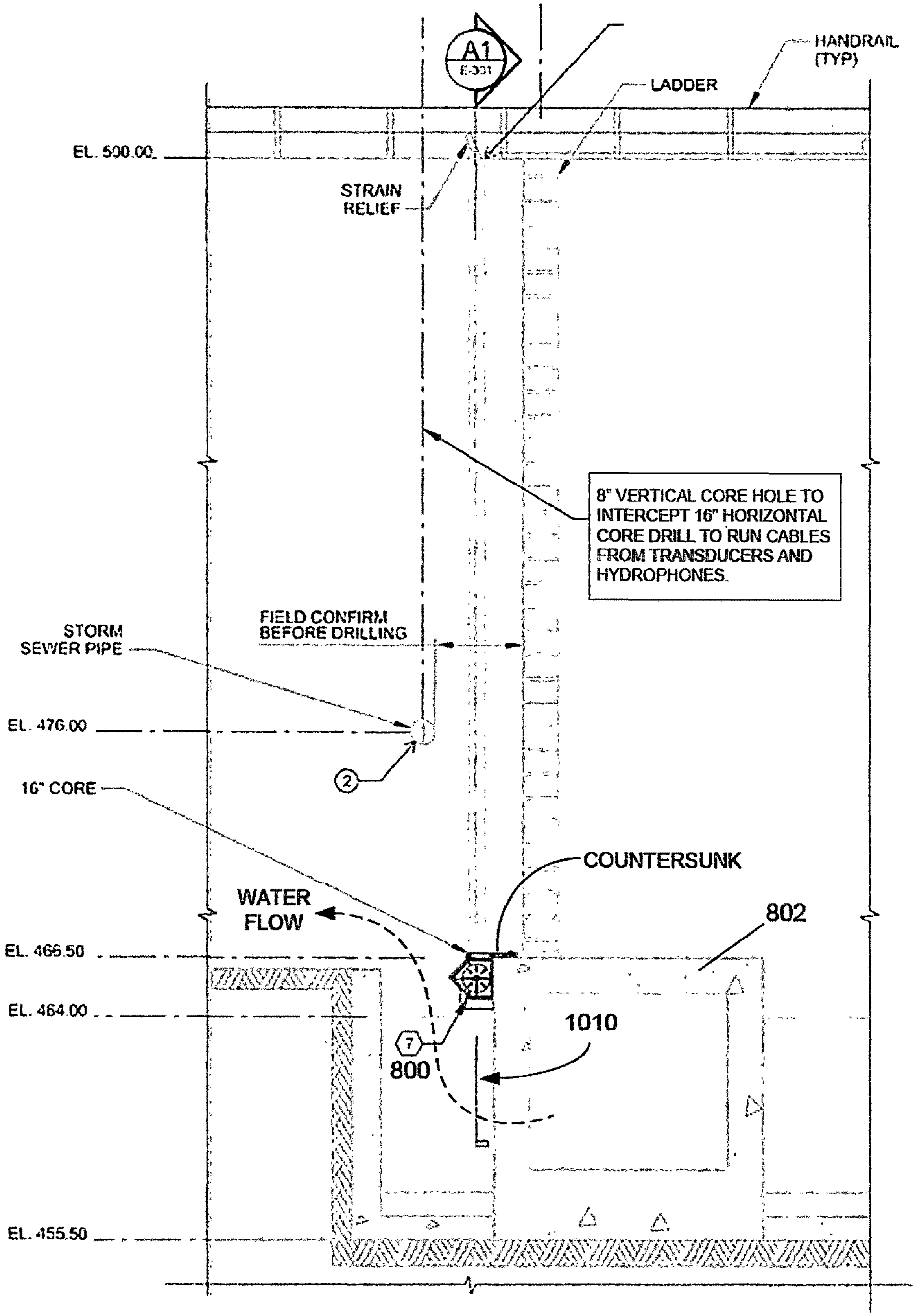
FIG. 10 shows a side view of the sound bar placement in the downstream lock approach, 5$^{th}$ discharge lateral.

FIG. 10 shows a side view of the sound bar placement in the downstream lock approach, 5$^{th}$ discharge lateral. This view shows how the soundbar 800 submerged entirely under water and was countersunk into the discharge lateral 802 thereby reducing the probability of strike from navigation vessels or from debris towed by navigation vessels. The top of the soundbar 800 is ½-inch higher than the elevation (EL. 466.50) of the top of the discharge lateral 802. The soundbar 800 is positioned to be countersunk and still above the discharge lateral ports 1010 (outlets for water discharge) to remove the potential of blocking a discharge. A mounting mechanism such as the J-hangers mechanism can be mounted to the top surface of the discharge lateral in a countersunk configuration to support the soundbar 800 just below the top of the discharge lateral 802.

In this challenging environment, the sound bar in accordance with an embodiment of the invention has been shown to perform extremely well, resist damage, remain operational, and achieve the needed sound levels for AC deterrence in the course of operation.

Figure 11A:
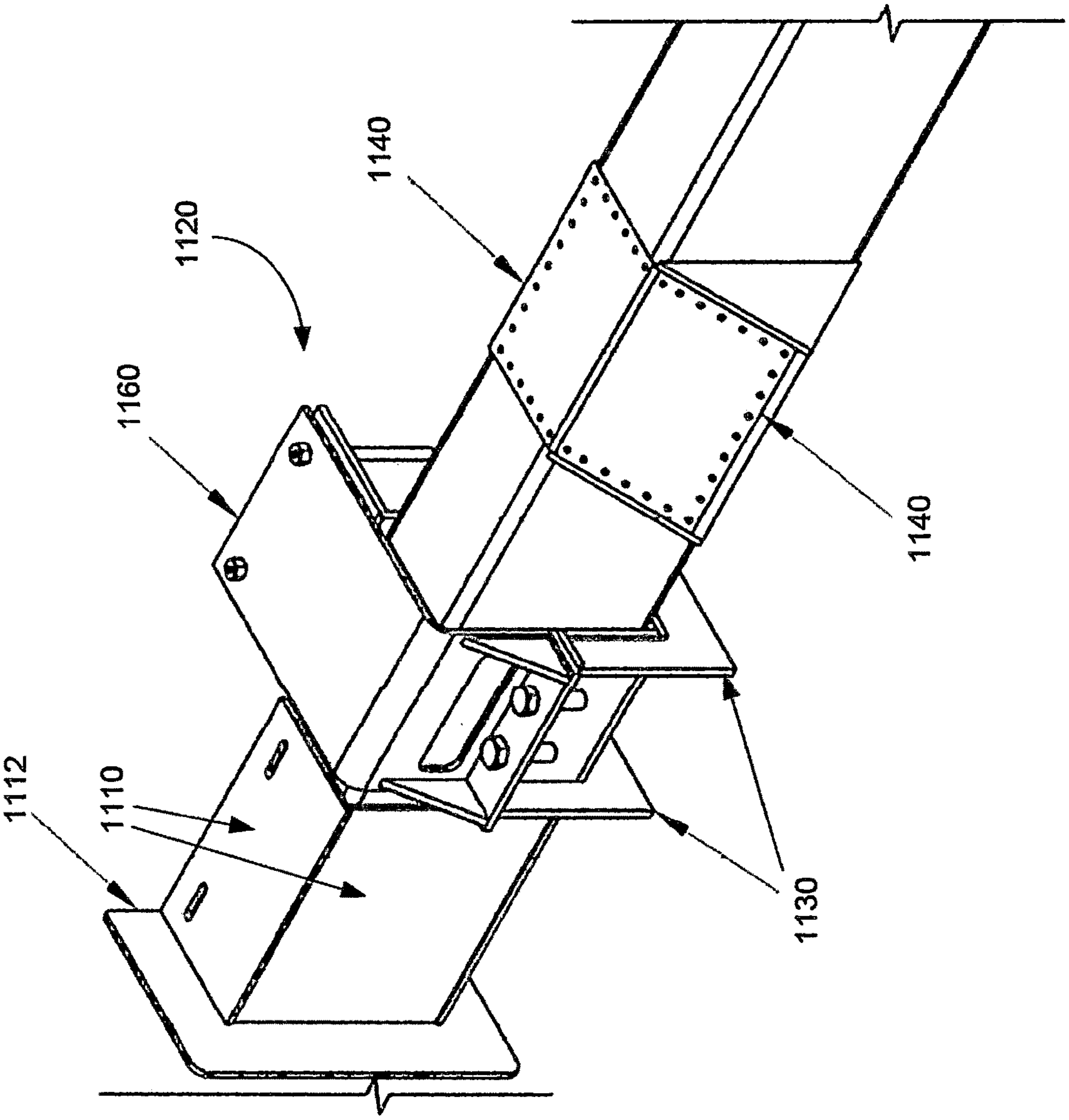
FIG. 11A shows a close-up view of the wiring access cover, J-hangers mechanism, and molded HPDE (High Density Poly Ethylene) cover.
Figure 11B:
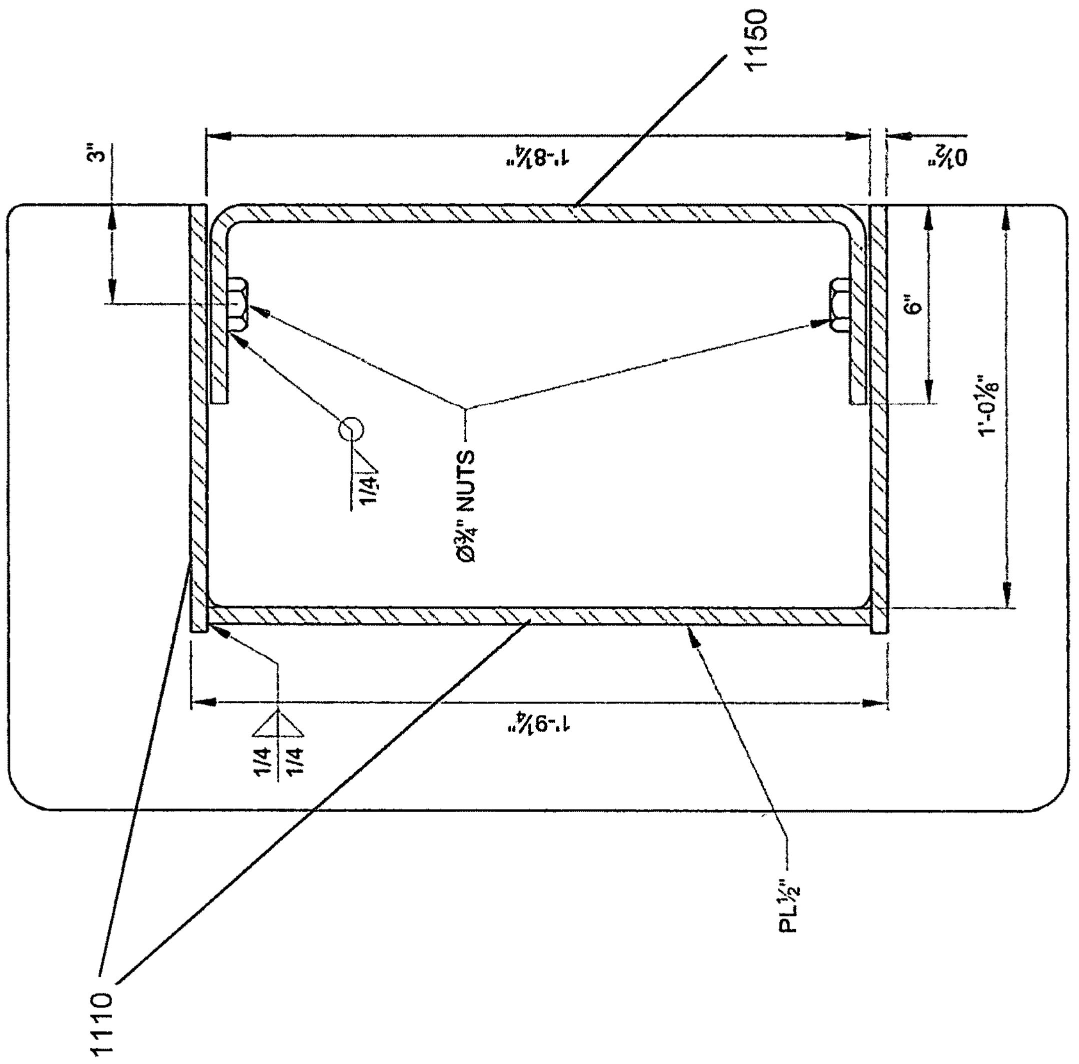
FIG. 11B illustrates a side sectional view of the wiring access cover mounted to the lock discharge emptying lateral wall.

FIG. 11A shows a close-up view of the wiring access cover (804 in FIG. 8), J-hangers mechanism 1120, and molded HPDE cover 1140. The wiring access cover includes top, bottom, and front supports 1110 and an end support 1112. FIG. 11B illustrates a side sectional view of the wiring access cover mounted to the lock discharge emptying lateral wall 1150. The top and bottom supports 1110 of the wiring access cover are mounted to the lock discharge emptying lateral wall 1150. The wiring access cover is detachably connected to the weldment to cover a wiring access opening disposed adjacent an end of the weldment. The wiring access cover is detachable from the weldment to allow access to wiring inside the weldment. The end support 1112 abuts the lock wall of the lock. The wiring access cover 1110 for easy access allows for an access area to conduct operations and maintenance of the cable bundles from the speakers to the control center (in operation room on lock wall) and to the soundbar.

The speaker cover 1140 detachably covers a speaker opening on the weldment to each speaker. The molded HPDE cover 1140 protects each speaker for accessibility in water or in air. HPDE is considered acoustically opaque. As such, the HPDE cover 1140 reduces a relatively small portion of the signal transmission. HPDE is a tough material that would absorb some impacts thereby protecting the speakers.

A mounting mechanism, which may be the J-hangers mechanism 1120, is configured to be attached to the discharge lateral. The mounting mechanism includes a plurality of bottom supports spaced from each other to support the weldment bottom at a plurality of locations and position the weldment top below a top surface of the discharge lateral and position the rear weldment side adjacent a front side of the discharge lateral. The bottom supports may include multiple pairs of J-shaped brackets 1130 configured to support the weldment bottom, front weldment side, and rear weldment side of the weldment. The mounting mechanism may further include an upper member 1160 which is detachably connected to each pair of J-shaped brackets 1130 to be disposed above the weldment and the pair of J-shaped brackets 1130. As seen in FIG. 10, the bottom supporting J-hangers 1130 (J-shaped supports) are mounted to the top of the discharge emptying lateral 802 (see FIG. 10) with 4 count Ø1-inch threaded anchors with 500 V3 epoxy adhesive, embedded 10-inches. This allows for the soundbar 800 to sit slightly below the top of the concrete discharge emptying lateral 802 (see FIG. 10). The top/upper member or top/upper plate 1160 enclosing the J-hangers mechanism 1120 is secured by fasteners such as bolts to the lower part of the J-hangers mechanism 1120 at two locations, e.g., the intermediate front flange and the upper rear anchoring flange of the J-hanger mechanism 1120.

Figure 12A:
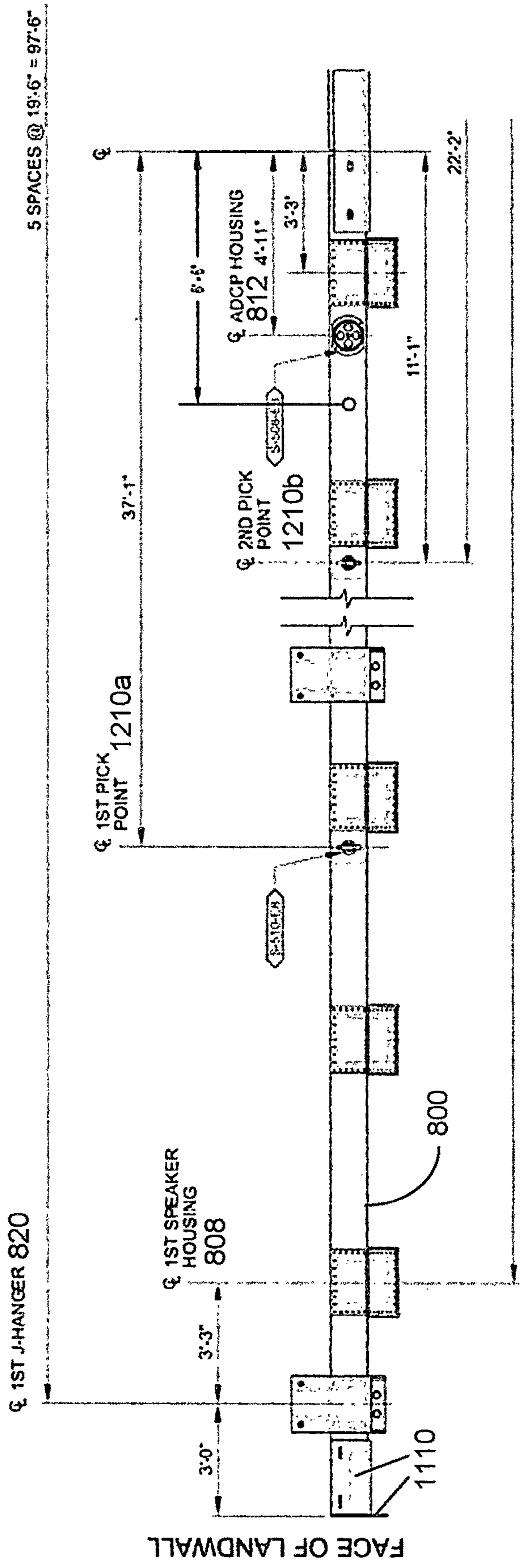
FIGS. 12A and 12B show a top view of sound bar placed within the discharge lateral and the placement of the J-hangers and crane pick points relative to the speaker housings, ADCP, hydrophone, wiring access cover, and the discharge lateral wall on the land side (FIG. 12A) and river side (FIG. 12B) of the downstream lock approach.
Figure 12B:
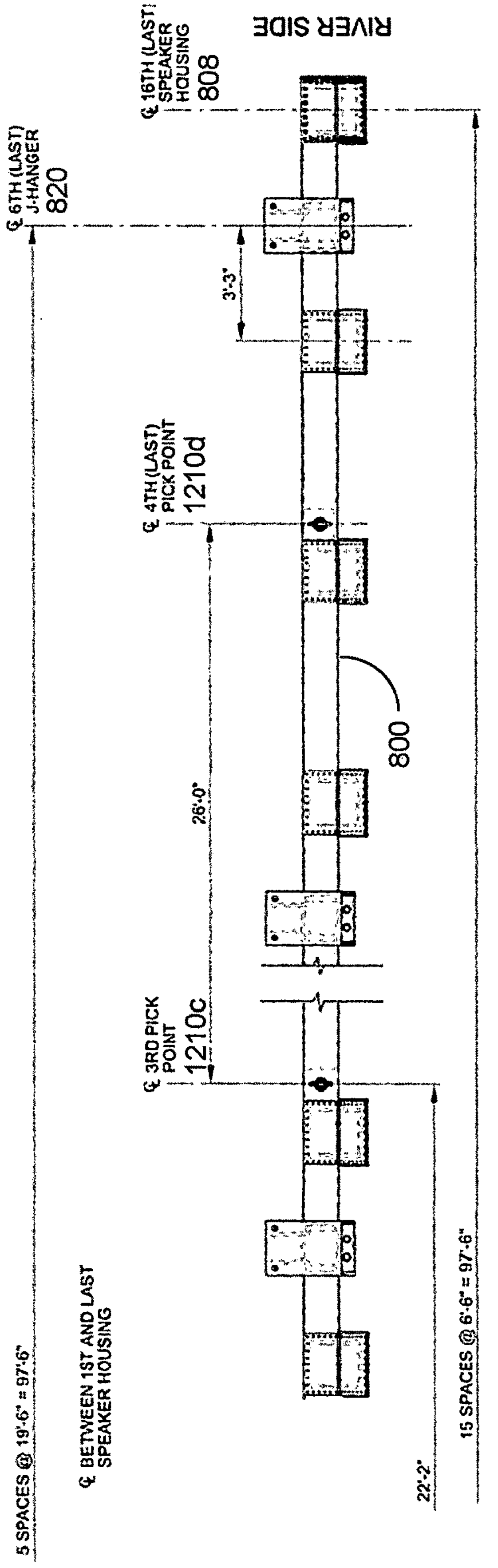

FIGS. 12A and 12B show a top view of sound bar placed within the discharge lateral and the placement of the J-hangers 820 and crane pick points 1210*a*-1210*d* relative to the speaker housings 808 for housing the speakers, ADCP 812, hydrophone 816, wiring access cover 1110, and the discharge lateral wall on the land side (FIG. 12A) and river side (FIG. 12B) of the downstream lock approach. A plurality of speakers are disposed at the speaker housings 808 inside the weldment and spaced from each other. The J-hangers 820 are used for mounting the sound bar 800 to the top of a discharge emptying lateral 802 (see FIG. 10) and allow the soundbar 800 to sit below grade on the side of the discharge emptying lateral 802, which reduces the risk of navigation and river debris damaging the sound bar. The pick points 1210*a-d* are used for lifting and setting the sound bar into the discharge lateral such that the rigging points are based on the structural integrity and capability to remove the pick point 1210*a*-1210*d* to create a flat surface on the sound bar 800, thus navigation or river debris would not strike or get hung on the sound bar. The pick points 1210*a*-1210*d* are design to also ease the deployment and thus the end picks (1210*a*, 1210*d*) can tolerate a 7000-pound load lift, and the two middle picks (1210*b*, 1210*c*) can tolerate a 4,600-pound load lift. In total the expected design load was for 23,200 pounds, including the estimated weight of 18000 pounds of cabling. Each pick design load is developed such that the load limit would not exceed any of the pick points working load limit.

Figure 13:
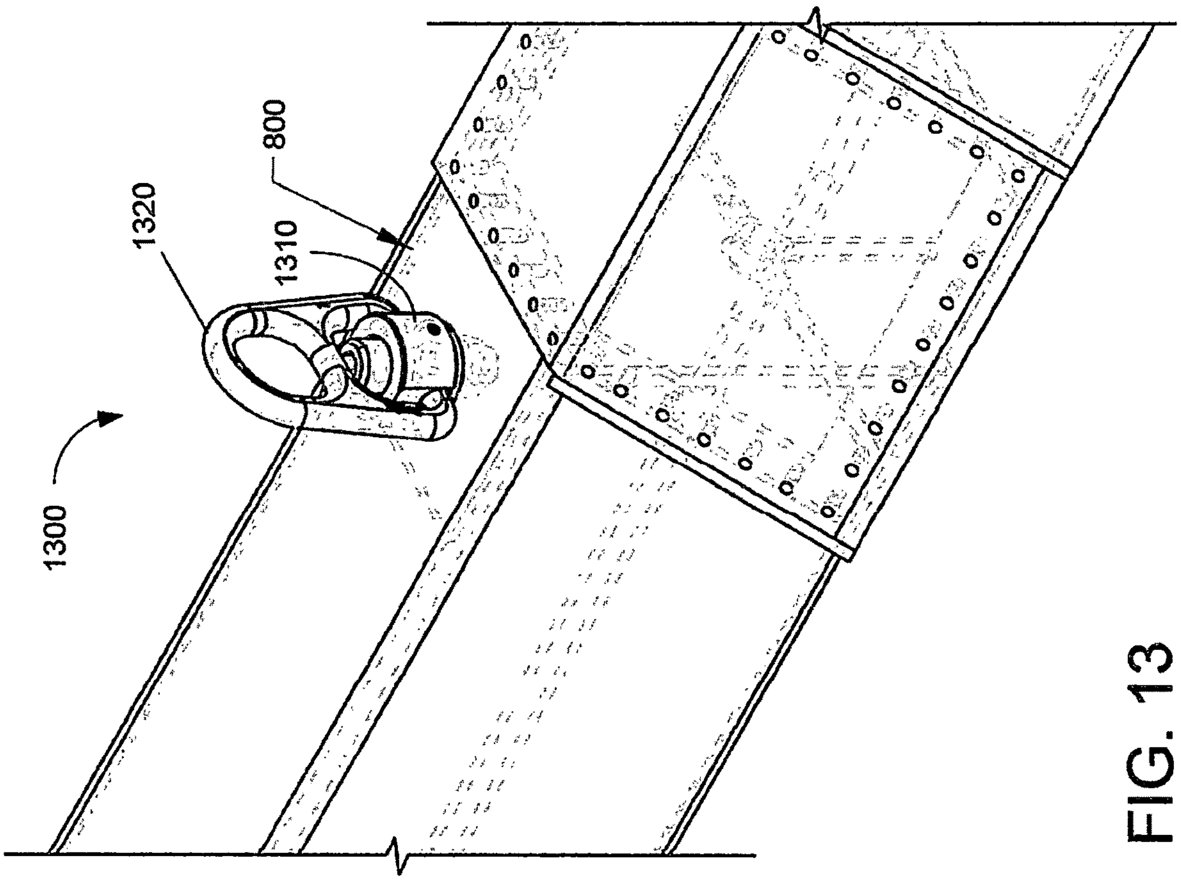
FIG. 13 shows a perspective view of a pick point support system attached to the sound bar.

FIG. 13 shows a perspective view of a pick point support system 1300 attached to the sound bar 800. The pick point support system 1300 includes a pick point support 1310 attached to the sound bar 800 and a pick point 1320 detachably connected to the pick point support 1310. The pick points are removable, which allows for a lower profile in the lock approach chamber, minimizing navigation and debris impact. The pick point support system 1300 includes a plurality of pick point supports 1310 attached to the weldment of the sound bar 800 at a plurality of locations distributed on an exterior surface of the weldment and a plurality of pick point devices 1320 detachably connected to the pick point supports 1310.

When a decision has been made to use a certain acoustic profile and one or more engineered signals as described above, the novel sound bar is tunable to deliver the engineered signal to the entirety of the Lock & Dam approach channel or chamber environment and its unique configuration and characteristics in the instance where that is the design goal for AC deterrence.

As described above, the number of transducers used to emit the engineered signal into the underwater environment may vary, and in embodiments of the invention the number of transducers may be 10-15, 15-20, or more than 20. The Lock No. 19 facility employs 16 transducers in the sound bar in accordance with the invention.

Figure 14:
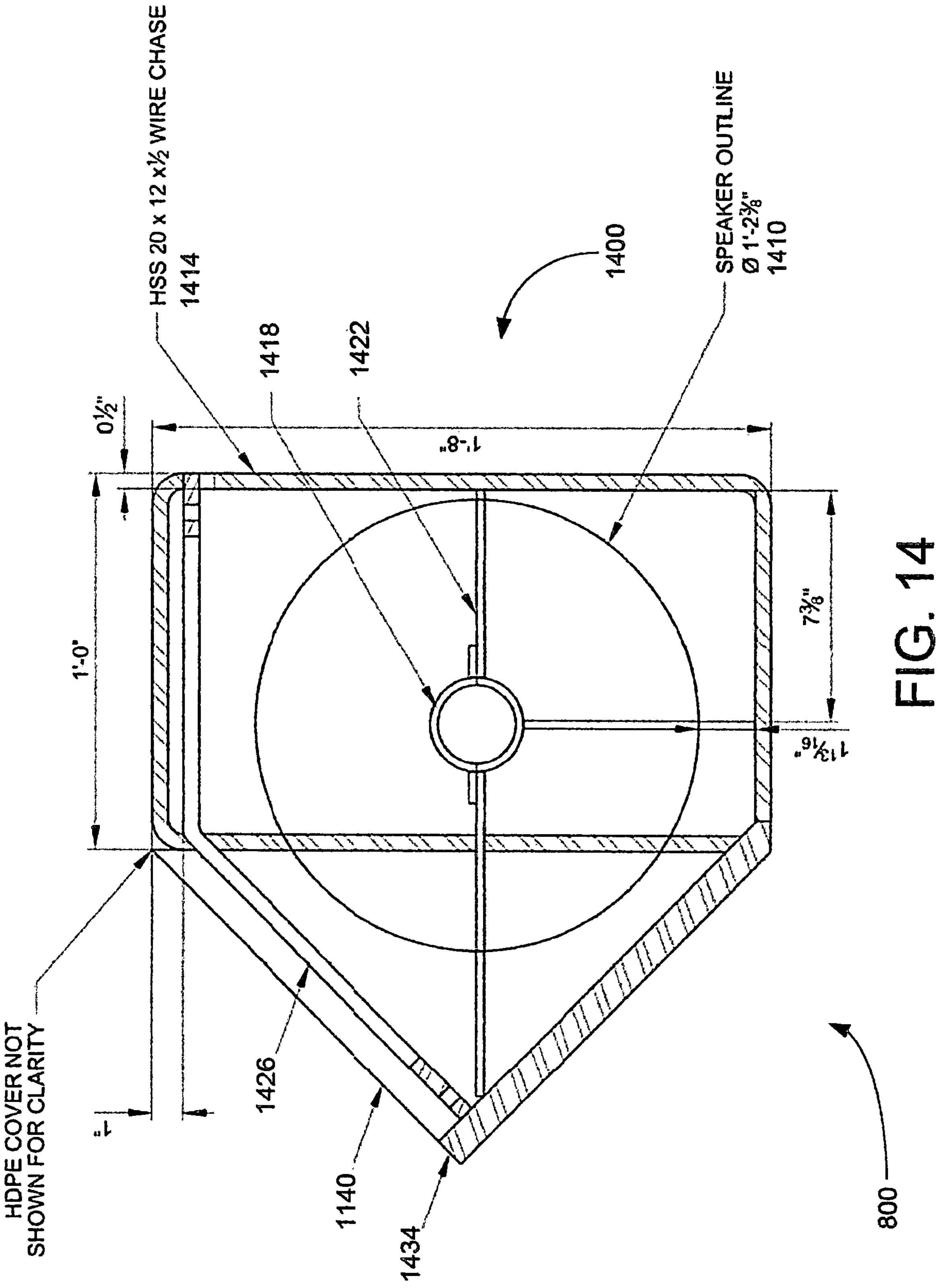
FIG. 14 shows a side view of the speaker holding chassis developed such that each speaker could be suspending within the sound bar using the manufacture design for points of support.

FIG. 14 shows a side view of the speaker holding chassis 1400 developed such that each speaker 1410 (e.g., 1' 2⅜" diameter) could be suspended within the sound bar 800 using the manufacture design for points of support. The speaker holding chassis 1400 includes speaker support braces (1418, 1422) and neoprene spacers that fit into the space created by a ring clamp 1418. A weldment 1414 of the soundbar is a hollow structural section (HSS 20×12×½) indicating that the weldment 1414 is 20 inches in height, 12 inches in width, ½ inches in wall thickness with a nominal weight of 116.91 lb/ft. The weldment 1414 includes a weldment top, a weldment bottom, a front weldment side, and a rear weldment side. The top ring clamp 1418 made of stainless steel, 3/16-inch thickness provides a top brace to contain the cone of the speaker in place. The lower speaker brace 1422 has three pieces connected between the top brace 1418 and the weldment 1414 (more specifically the weldment bottom, front weldment side, and rear weldment side). The lower speaker brace 1422 may be made of stainless steel, 3/16", and serves to hold the speaker 1410 in place. The lower brace 1422 is attached to the weldment 1414 in 3 locations. There are two sets of top and lower braces (1418, 1422) per speaker, one for each side (see FIGS. 15, 16, 17, and 19). This design allows for the speakers to be hung in a manner that prevents the cones of the speaker from touching the speaker housing or weldment 1414 of the sound bar which would reduce abrasion and corrosions rates, allows for the water to assist in cooling the speakers on all sides, and increases performance of the speaker based on manufacturer data which shows reduced sound projection on the cone ends compared to the rest of the speaker.

A flange plate 1426 is used for fastening the HDPE speaker cover 1140 to the weldment in a continuous weld and has predrilled holes that fit the stainless 7/16-inch bolts and nuts. FIG. 14 shows a side view of the speaker cover 1140 which may be comprised of HDPE 1-inch thick. To minimize the overall amount of materials in the discharge lateral, the weldment 1414 is kept to a narrowest width based on load and hydraulic flow needs. Thus, additional structure 1434 (e.g., made of steel) can be welded on to create "bump-outs" for the speakers. This design allows for the speakers 1410 to be protected from navigation (using the weldment 1414, flange plate 1426, and speaker cover 1140) and river debris (via the HDPE speaker cover 1140), reduces metal to metal contact (using the speaker support braces 1418, 1422), and allows for rubber washers or neoprene spacers to be placed with chassis touch points (at the top ring clamp 1418) for additional vibration absorption.

Figure 15:
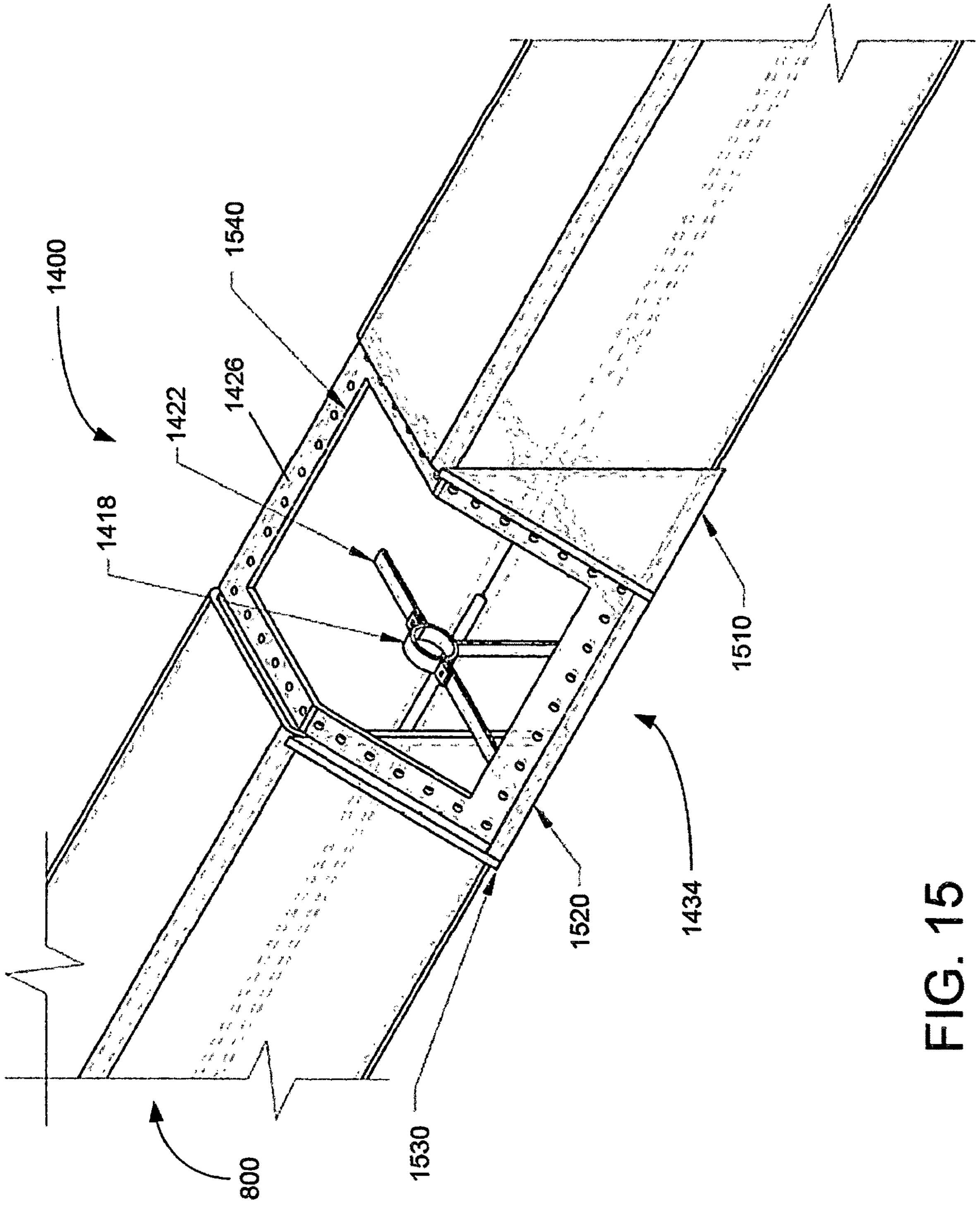
FIG. 15 shows an overhead angled view of the design of the speaker chassis and speaker bump-out that accommodates the speaker shape (two cones), built away from the main weldment to increase the exposure of the speaker for greater sound transmission, and allow for a protective cover to be secured.
Figure 19:
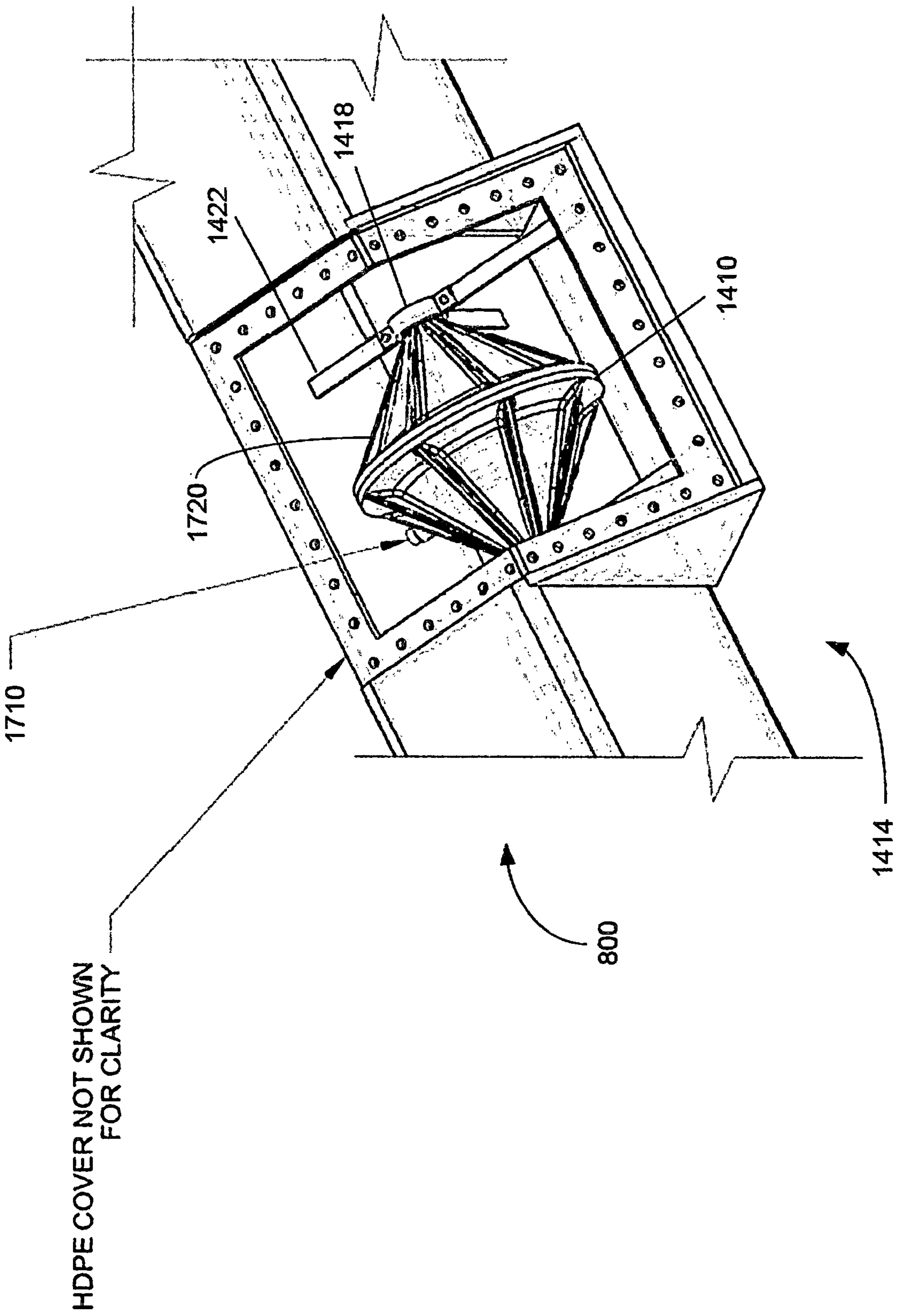
FIG. 19 shows the top angled view of the soundbar weldment with focus on the speaker casing cone and the brake attached to the sound bar to prevent spinning of the speaker cone in the support chassis.

FIG. 15 shows an overhead angled view of the design of the speaker chassis 1400 and speaker bump-out 1434 that accommodates the speaker shape (two cones as best seen in FIG. 19), built away from the main weldment 1414 to increase the exposure of the speaker 1410 for greater sound transmission, and allow for a protective cover to be secured. The speaker chassis 1400 includes two stainless steel braces, 1418, 1422 (best seen in FIG. 14) that are attached to the weldment 1414 in three locations. The speaker bump-out 1434 includes side bump-out plates 1510, 1530 illustrating how the weldment 1414 is altered to the location of the speaker by adding on 20-inch high×9¾-inch wide×⅝-inch plates. A lower plate 1520 is used to connect the bump-out side plates 1510, 1530 and may be about 21-inches long, 11¼-inches wide, and ⅝-inches thick. The cover fastener flange 1426 is welded to the weldment and used to secure the HDPC cover to the opening 1540 on the weldment 1414. This may be 2-inch wide and predrilled holes for stainless nuts and bolts.

Figure 16:
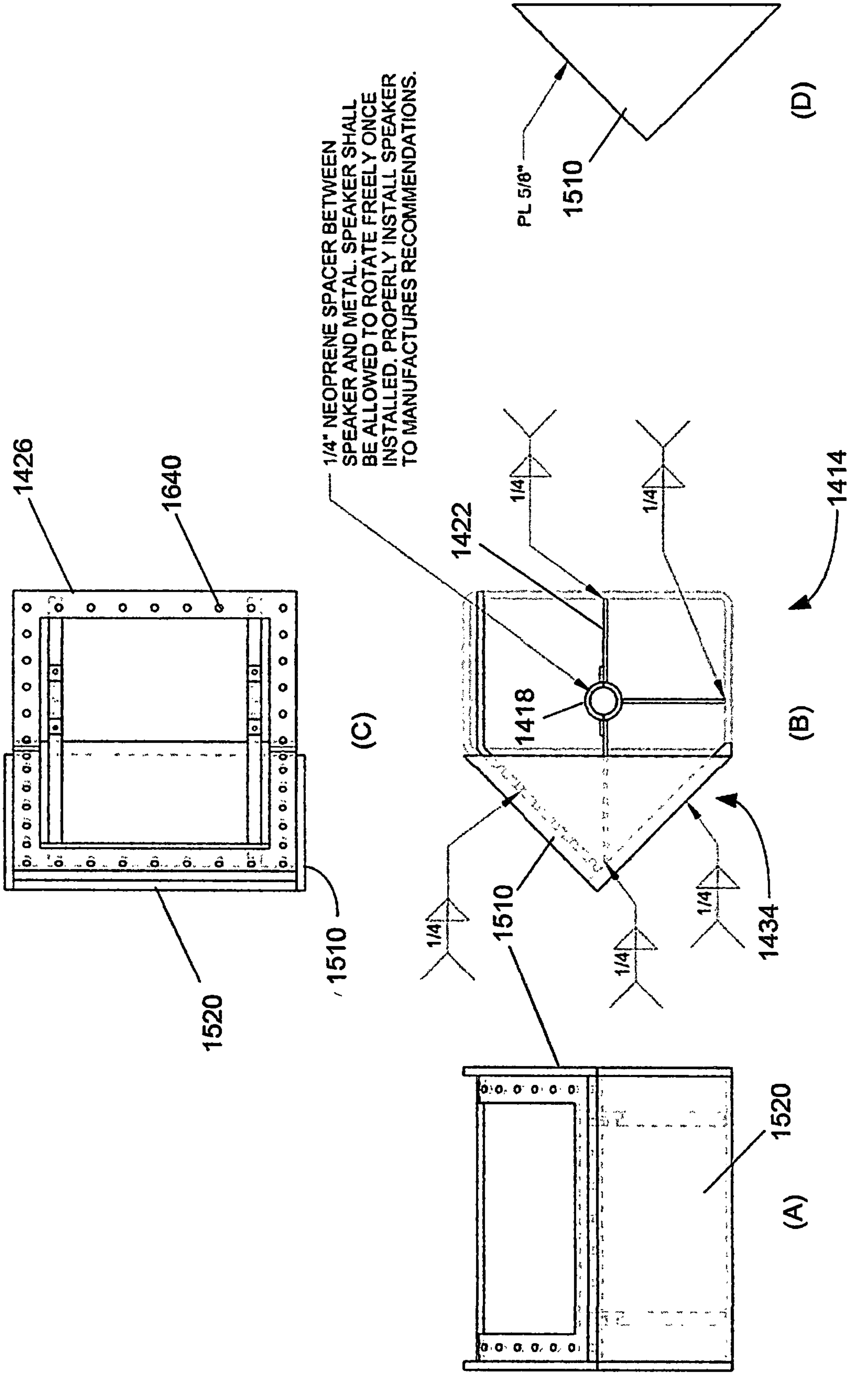
FIG. 16 shows (A) a front view, (B) a side view, and (C) a top or overhead view of the design of a weldment of the soundbar 800 including the speaker bump-out, and (D) the bump-out side plate.

FIG. 16 shows (A) a front view, (B) a side view, and (C) a top or overhead view of the design of the weldment 1414 of the soundbar 800 including the speaker bump-out 1434, and (D) the bump-out side plates 1510, 1530. The soundbar is designed to accommodate the speaker shape, expose the speaker 1410 for greater sound transmission, and allow for the protective cover, indicating the 40 preplaced holes 1640 needed for fitting the HPDE cover 1140 to the soundbar. FIG. 16 shows in view (B) a location for a neoprene spacer placed between the cone of the speaker 1410 and the top brace 1418, and lower brace 1422 that make up the speaker chassis 1400. The speaker is allowed to rotate freely once installed.

Figure 17:
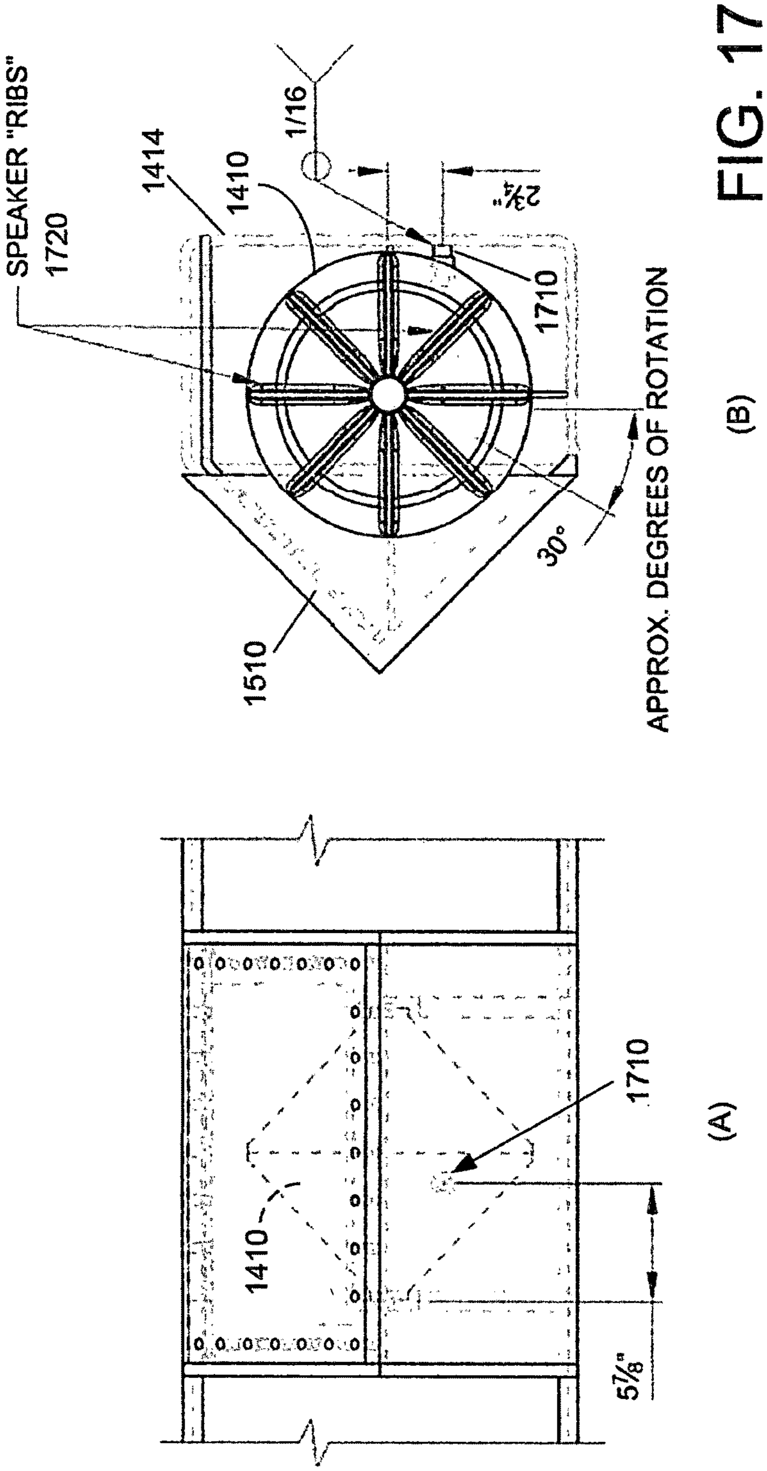
FIG. 17 shows (A) a front view and (B) a side view of the brake placement.

FIG. 17 shows (A) a front view and (B) a side view of the brake placement. The brake 1710 extends from the wire chase or weldment 1414. The brake 1710 does not touch the speaker case of the speaker 1410. The brake 1710 protrudes from an interior surface of the weldment toward the speaker between the conical ribs to block the speaker conical ribs 1720 from spinning movement of the speaker. This design reduces the likelihood of torquing the speaker wiring.

Figure 18:
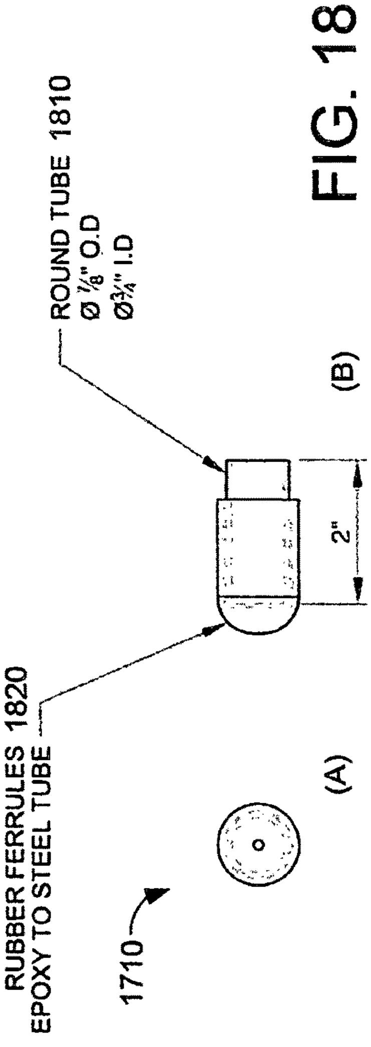
FIG. 18 shows (A) a front view and a (B) a side view of design of the soundbar brake.

FIG. 18 shows (A) a front view and a (B) a side view of design of the soundbar brake 1710. In this example, the soundbar brake 1710 comprises a round tube 1810 which may be made of a metal such as steel and rubber ferrules 1820 epoxy to the tube 1810.

FIG. 19 shows the top angled view of the soundbar weldment 1414 (824 in FIG. 8) with focus on the two speaker casing cones of the speaker 1410 and the brake 1710 attached to the sound bar 800 to prevent spinning of the speaker cone in the support chassis by blocking the speaker conical ribs 1720 from movement/spinning. The HDPE (High Density Polyethylene) or HPDE cover 1140 is not shown to expose the interior. Each speaker has a dual conical structure including a first cone having a first apex and a second cone having a second apex facing in an opposite direction away from the second apex. The speaker chassis includes a first ring clamp 1418 to contact and support the first cone and at least three first support braces 1422 spaced around the first ring clamp and connected between the first ring clamp 1418 and the weldment 1414, and a second ring clamp 1418 to contact and support the second cone and at least three second support braces 1422 spaced around the second ring clamp and connected between the second ring clamp 1418 and the weldment 1414.

Figure 20:
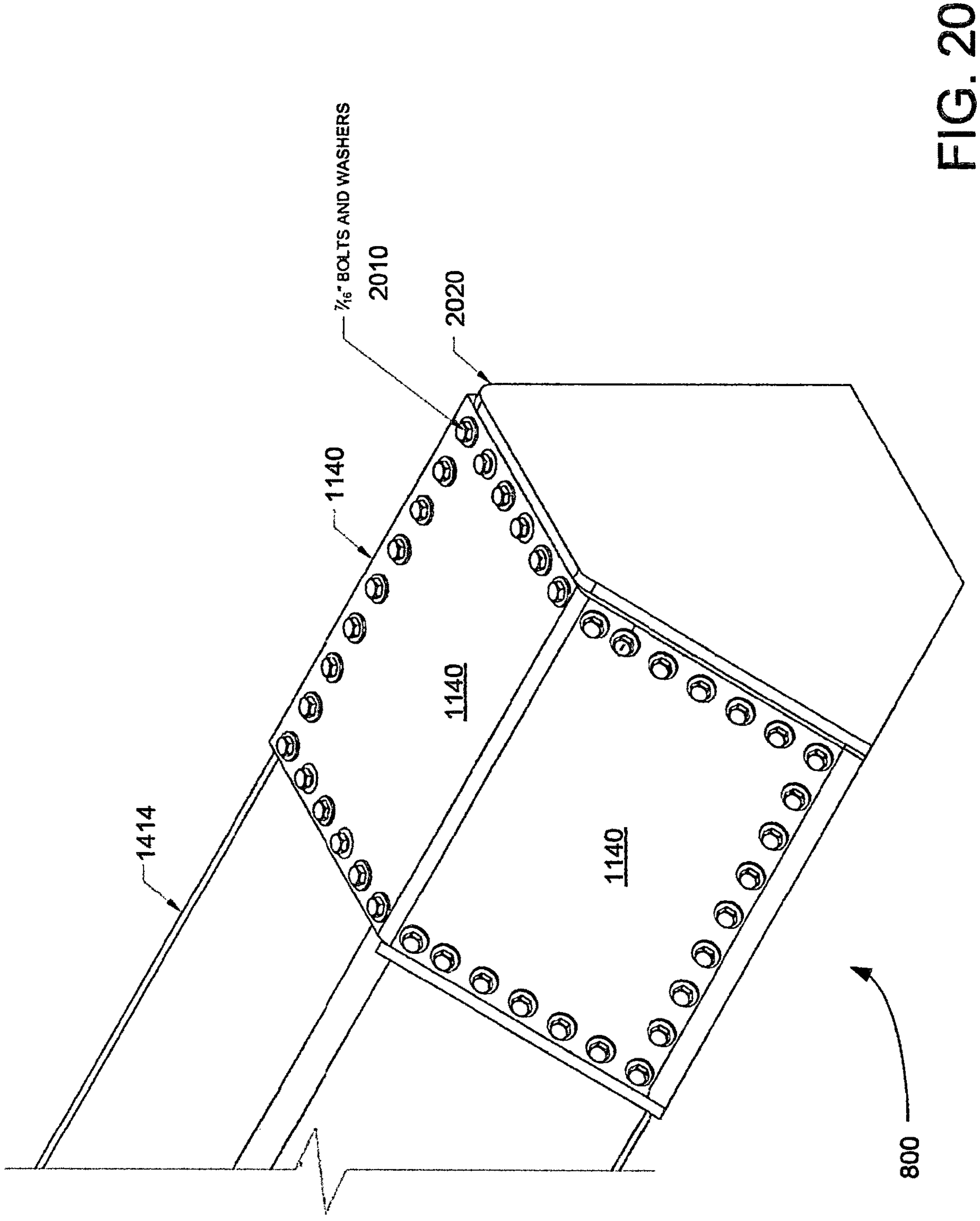
FIG. 20 shows the top angled view of the soundbar weldment with focus on the 40 ct 7/16 bolts and 40 ct 7/16 washers in place to secure the HPDE cover to the soundbar.

FIG. 20 shows the top angled view of the soundbar weldment 1414 (824 in FIG. 8) with focus on the 40 ct $\frac{7}{16}$ bolts and 40 ct $\frac{7}{16}$ washers 2010 in place to secure the HPDE cover 1140 to the soundbar 800. The sound bar end cover plate 2020 may be 21¾"-inches wide, 20-inches in height and ⅝" thick.

In the concept of operation hydrophones are placed throughout the Lock & Dam to assist with initial startup, tuning and operational monitoring of the sound bar device in accordance with embodiments of the invention, such that the engineered signal is sufficient to deter AC in the particular application.

In embodiments of the invention, each of the 16 transducers have dedicated, individual amplifiers computer controlled to effectuate the transmission of the engineered signal at the correct intensity to deter AC yet not use an excessive amount of power. Not only do the hydrophones interact with the sound bar during initial startup and tuning wherein the individual transducers have a calibrated output, afterwards in routine and extended operation, but the computer-controlled system has the capability to monitor the operation of the entire sound bar such that any malfunction of an individual component of the sound bar can be detected and corrected.

In embodiments of the invention, Acoustic Doppler Current Profilers (ADCPs) may be installed in the sound bar to provide accurate readings of flow and velocity of the current over the sound bar. The knowledge gained from the ADCP can help to gain not only the flows passing over the sound bar, which is of interest to managing AC and to managing navigation approach.

Figure 21:
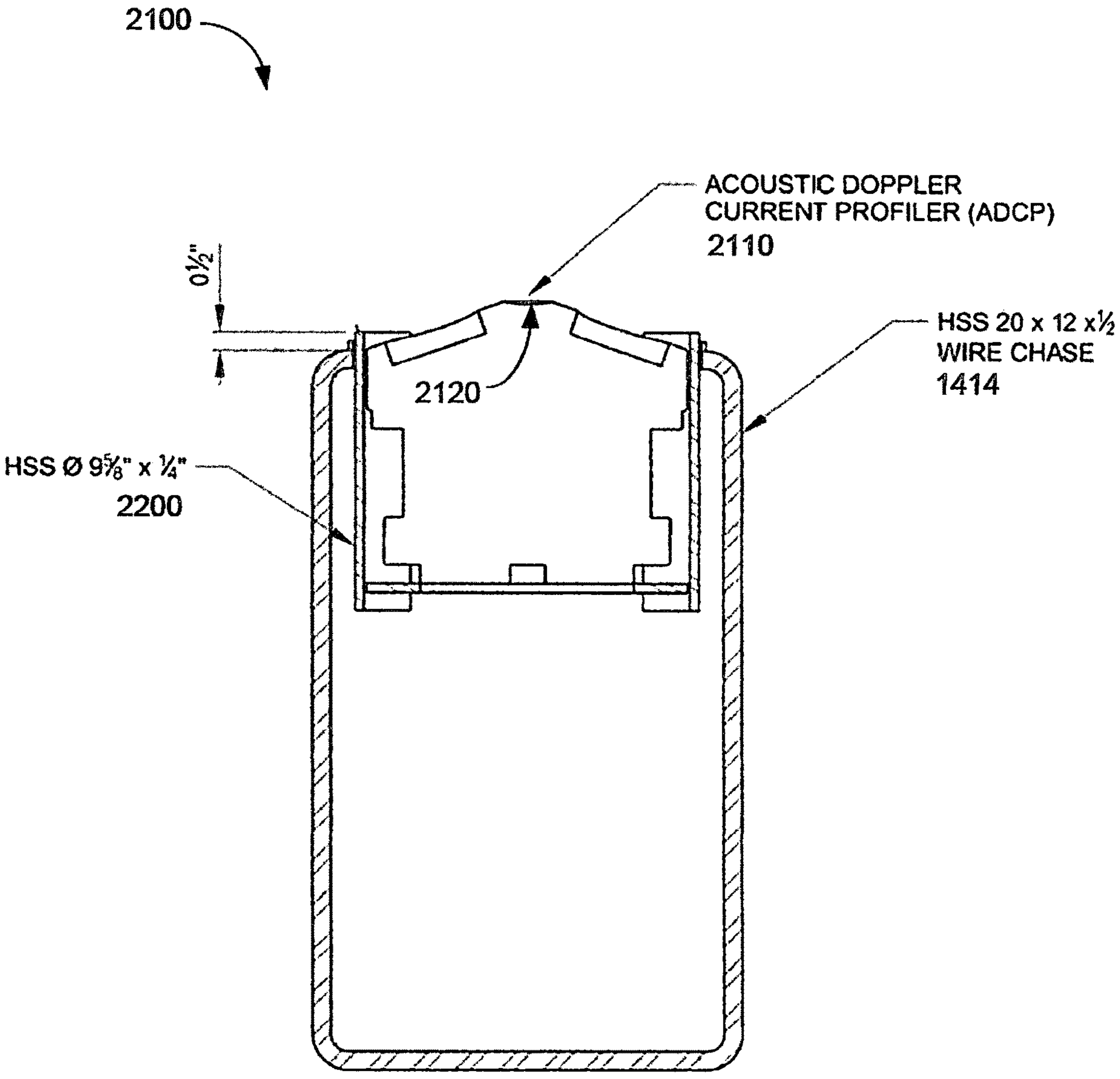
FIG. 21 shows a side view of the support system used to contain the acoustic doppler current profiler (ADCP) within the weldment of the soundbar.

FIG. 21 shows a side view of the support system 2100 used to contain the acoustic doppler current profiler (ADCP) 2110 within the weldment 1414 of the soundbar. The support system 2100 is mounted on or joined to the weldment 1414 HSS 20 by 12 by ½" wire chase. The ADCP 2110 includes an open access 2120 looking upward into point for ADCP sensors.

Figure 22:
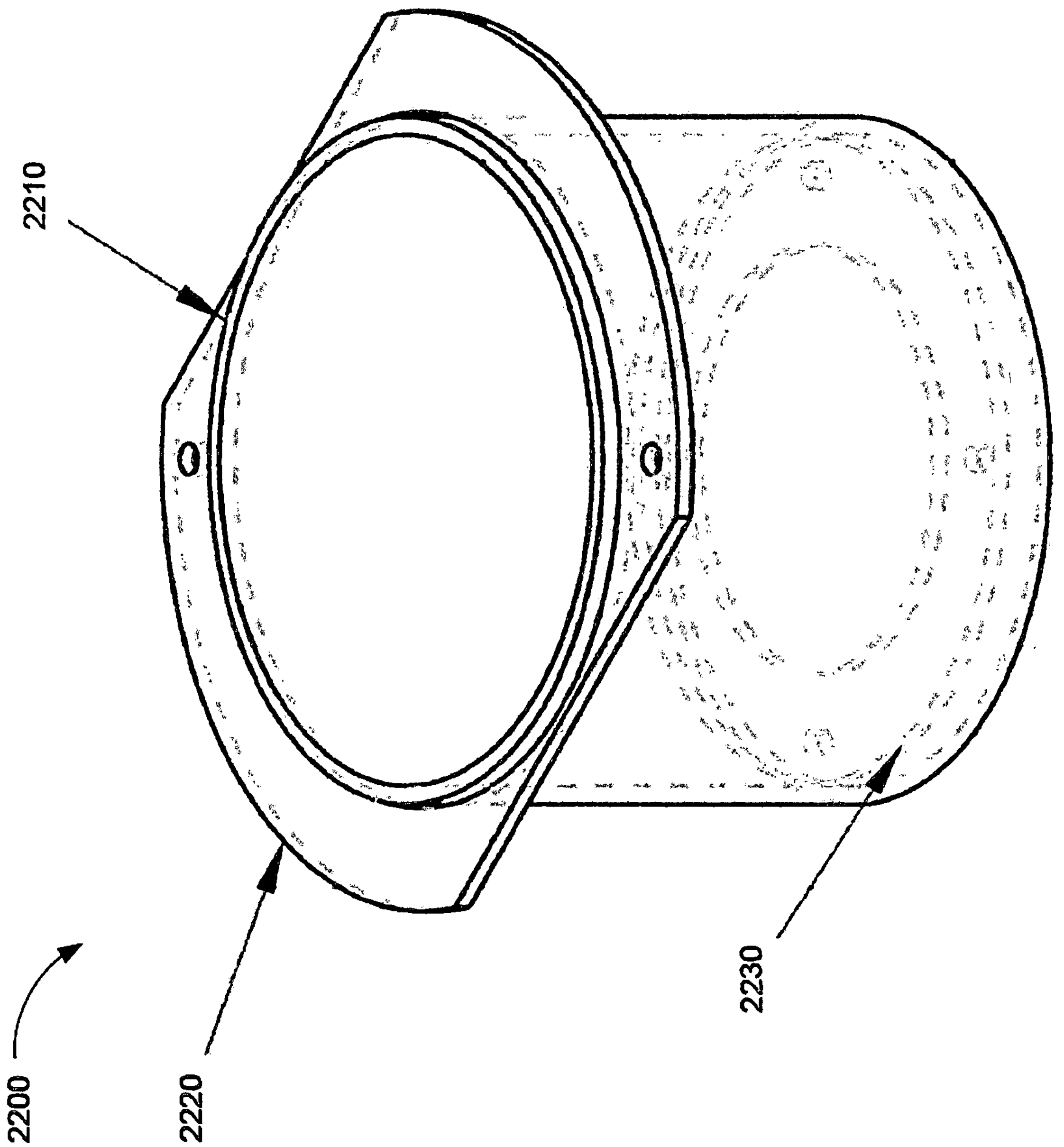
FIG. 22 shows a perspective view of the support system in the form of a chassis support system used to contain the ADCP.

FIG. 22 shows a perspective view of the support system in the form of a chassis support system 2200 used to contain the ADCP 2110. The chassis support system or ADCP chassis 2200 is comprised of HSS 9'⅝"×¼" which is 6½" deep below a flange 2220 at the upper opening 2210, or 7¾" deep including the flange 2220 and 10" in external diameter, and 9⅛" in internal diameter 2230. The ADCP chassis 2200 is configured to contain each ADCP within the weldment 1414 and position the open access 2120 of the ADCP 2110 upward at a top opening of the weldment 1414 corresponding to the ADCP. The ADCP chassis 2200 is open on the bottom for the ADCP cabling to run inside of the weldment 1414. The drill thread match in the HSS flange 2220 is for ⅜" diameter bolts, for instance.

Figure 23A:
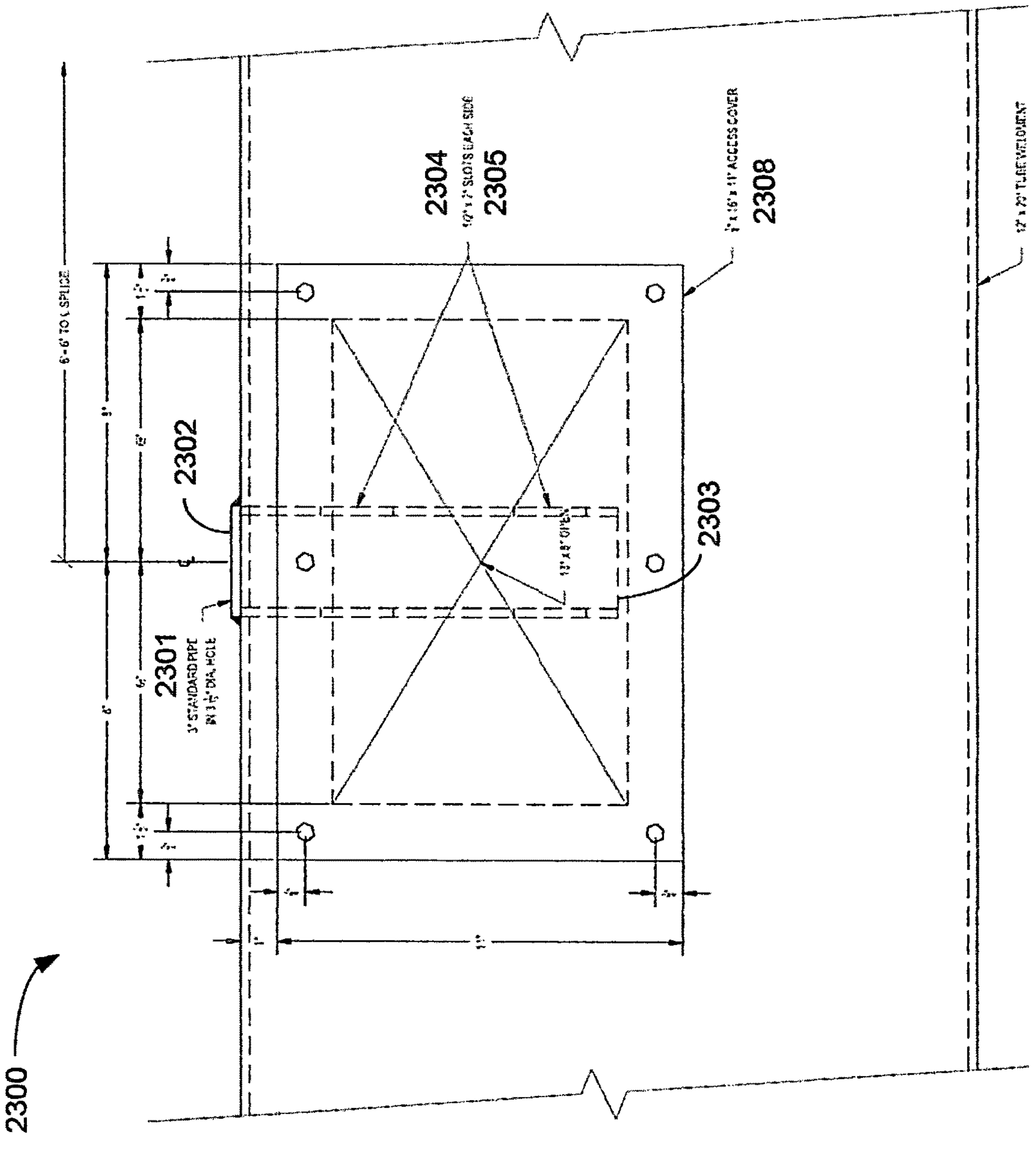
FIG. 23A is a front view illustrating an example of a hydrophone chassis in the weldment of the soundbar.
Figure 23B:
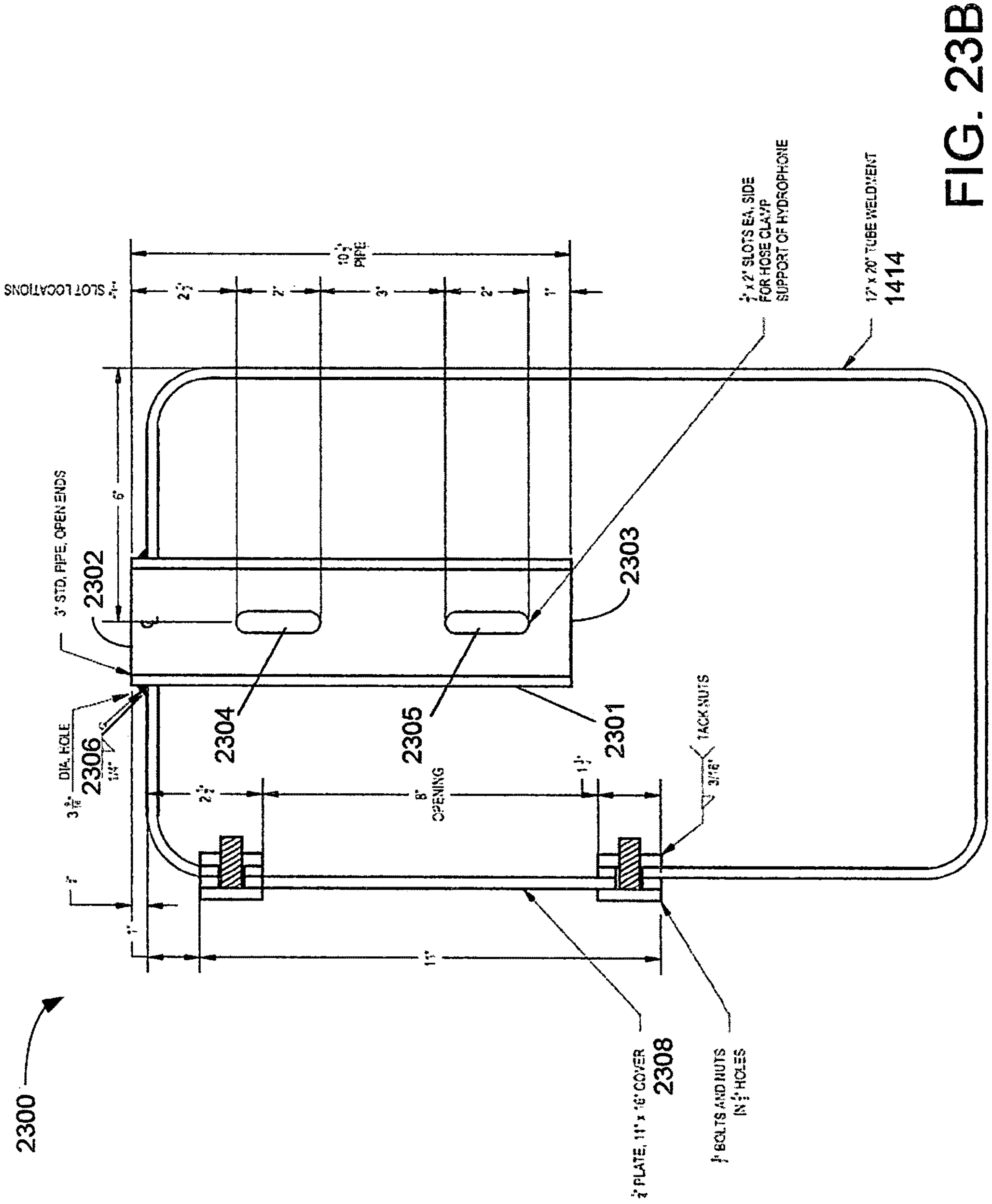
FIG. 23B is a side view of the hydrophone chassis of FIG. 23A.

FIG. 23A is a front view illustrating an example of a hydrophone chassis 2300 in the weldment 1414 of the soundbar. FIG. 23B is a side view of the hydrophone chassis 2300 of FIG. 23A. The hydrophone chassis 2300 holds or keeps the hydrophone (816 in FIG. 8) in place with nylon slip lining to snug the lower hydrophone into the chassis without adding pressure to the sensing elements. The hydrophone chassis 2300 includes a pipe 2301 which may be a 3-inch wide, 10½-inch long standard pipe with an open top 2302 and an open bottom 2303. The hydrophone chassis 2300 is disposed inside the weldment 1414 to support each hydrophone within the weldment 1414. The hydrophone chassis 2300 includes a tube or pipe 2301 having an open top end 2302 attached to an opening at the weldment top to expose a hydrophone sensor of the hydrophone and an open bottom end 2303 facing toward and spaced from an interior surface of the weldment bottom. The tube 2301 includes a plurality of longitudinal slots spaced from each other between the open top end 2302 and the open bottom end 2303. This design allows for the hydrophone sensor to be placed above the sound bar for better detection of sound, and for the cable to run within the weldment 1414. Two slots 2304, 2305 are about 2-inches in length and ⅓-inch in width and are used to place tightening screws into the nylon material. Additional support can be provided by a hose clamp that is disposed around and through each slot 2304, 2305 to add additional pressure on the nylon without touching the sensing element of the hydrophone. The hydrophone chassis 2300 itself is joined to the weldment 1414, for instance, with ¼-inch welds 2306. The hydrophone chassis 2300 can be accessed from the side of the weldment 1414. The hydrophone access plate 2308 is HSS ¾" think plate, 11" in height, and 16" in width. The access plate 2308 is secured to the weldment 1414 in 3 locations along the bottom and 3 locations along the top for ½" bolts and nuts in ⅝" threaded HSS, as best seen in FIG. 23A.

Embodiments of the invention can be manifest in the form of methods and apparatuses for practicing those methods.

Unless explicitly stated otherwise, each numerical value and range should be interpreted as being approximate as if the word "about" or "approximately" preceded the value or range.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It will be further understood that various changes in the details, materials, and arrangements of the parts which have been described and illustrated in order to explain embodiments of this invention may be made by those skilled in the art without departing from embodiments of the invention encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. A sound bar for producing engineered acoustic signals for keeping an animal away from one or more specific areas, the sound bar comprising:

a weldment having a weldment top, a weldment bottom, a front weldment side, and a rear weldment side;

a plurality of speakers disposed inside the weldment and spaced from each other;

at least one acoustic doppler current profilers (ADCP) disposed inside the weldment;

at least one hydrophone disposed inside the weldment; and a mounting mechanism configured to be attached to a discharge lateral, the mounting mechanism including a plurality of bottom supports spaced from each other to support the weldment bottom at a plurality of locations and position the weldment top below a top surface of the discharge lateral and position the rear weldment side adjacent a front side of the discharge lateral.

2. The sound bar of claim 1, wherein the bottom supports comprise multiple pairs of J-shaped brackets configured to support the weldment bottom, front weldment side, and rear weldment side of the weldment; and wherein the mounting mechanism further comprises an upper member which is detachably connected to each pair of J-shaped brackets to be disposed above the weldment and the pair of J-shaped brackets.

3. The sound bar of claim 1, wherein the speakers are configured to produce engineered acoustic signals having deterrence stimulus evaluated to maximize effectiveness in keeping an aquatic animal away from specific areas based on at least one of: ability of the deterrence stimulus to initiate a behavioral response of the aquatic animal to keep the aquatic animal from the one or more specific areas, duration of the behavioral response; or a magnitude of the behavioral response.

4. The sound bar of claim 1, further comprising:

a speaker chassis disposed inside the weldment for each of the speakers, the speaker chassis being connected between the weldment and the speaker to suspend the speaker inside the weldment and prevent the speaker from coming into contact with the weldment.

5. The sound bar of claim 4, wherein each speaker has a dual conical structure including a first cone having a first apex and a second cone having a second apex facing in an opposite direction away from the second apex; and wherein the speaker chassis includes a first ring clamp to contact and support the first cone and at least three first support braces spaced around the first ring clamp and connected between the first ring clamp and the weldment, and a second ring clamp to contact and support the second cone and at least three second support braces spaced around the second ring clamp and connected between the second ring clamp and the weldment.

6. The sound bar of claim 4, wherein each speaker has a conical structure including a plurality of conical ribs, the sound bar further comprising:

a brake protruding from an interior surface of the weldment toward the speaker between the conical ribs to block the conical ribs from spinning movement of the speaker.

7. The sound bar of claim 1, further comprising:

a speaker cover to detachably cover a speaker opening on the weldment to each speaker, the speaker cover being made of HPDE (High Density Poly Ethylene).

8. The sound bar of claim 1, further comprising:

an ADCP chassis to contain each ADCP within the weldment and position an open access of the ADCP upward at a top opening of the weldment corresponding to the ADCP, the ADCP chassis having a bottom opening through which ADCP cabling of the ADCP runs inside the weldment.

9. The sound bar of claim 1, further comprising:

a wiring access cover detachably connected to the weldment to cover a wiring access opening disposed adjacent an end of the weldment, the wiring access cover being detachable from the weldment to allow access to wiring inside the weldment.

10. The sound bar of claim 1, further comprising:

a hydrophone chassis disposed inside the weldment to support each hydrophone within the weldment, the hydrophone chassis comprising a tube having an open top end attached to an opening at the weldment top to expose a hydrophone sensor of the hydrophone and an open bottom end facing toward and spaced from an interior surface of the weldment bottom, the tube including a plurality of longitudinal slots spaced from each other between the open top end and the open bottom end.

11. A method of producing engineered acoustic signals for keeping an animal away from one or more specific areas, the method comprising:

attaching to a discharge lateral using a mounting mechanism, a weldment having a weldment top, a weldment bottom, a front weldment side, and a rear weldment side, the mounting mechanism including a plurality of bottom supports spaced from each other to support the weldment bottom at a plurality of locations and position the weldment top below a top surface of the discharge lateral and position the rear weldment side adjacent a front side of the discharge lateral;

disposing a plurality of speakers inside the weldment which are spaced from each other;

disposing at least one acoustic doppler current profilers (ADCP) inside the weldment; and disposing at least one hydrophone inside the weldment.

12. The method of claim 11, wherein the bottom supports comprise multiple pairs of J-shaped brackets, the method further comprising:

supporting, using the multiple pairs of J-shaped brackets, the weldment bottom, front weldment side, and rear weldment side of the weldment; and detachably connecting an upper member of the mounting mechanism to each pair of J-shaped brackets to be disposed above the weldment and the pair of J-shaped brackets.

13. The method of claim 11, further comprising:

producing, via the speakers, engineered acoustic signals having deterrence stimulus evaluated to maximize effectiveness in keeping an aquatic animal away from specific areas based on at least one of: ability of the deterrence stimulus to initiate a behavioral response of the aquatic animal to keep the aquatic animal from the one or more specific areas, duration of the behavioral response; or a magnitude of the behavioral response.

14. The method of claim 11, further comprising:

supporting each speaker using a speaker chassis inside the weldment, the speaker chassis being connected between the weldment and the speaker to suspend the speaker inside the weldment and prevent the speaker from coming into contact with the weldment.

15. The method of claim 11, wherein each speaker has a conical structure including a plurality of conical ribs, the method further comprising:

blocking the conical ribs from spinning movement of the speaker using a brake protruding from an interior surface of the weldment toward the speaker between the conical ribs.

16. The method of claim 11, further comprising:

detachably covering a speaker opening on the weldment to each speaker, using a speaker cover made of HPDE (High Density Poly Ethylene).

17. The method of claim 11, further comprising:

placing the weldment on the plurality of bottom supports or lifting the weldment from the plurality of bottom supports of the mounting mechanism, using a pick point support system which includes a plurality of pick point supports attached to the weldment at a plurality of locations distributed on an exterior surface of the weldment and a plurality of pick point devices detachably connected to the pick point supports.

18. The method of claim 11, further comprising:

containing each ADCP within the weldment using an ADCP chassis and positioning an open access of the ADCP upward at a top opening of the weldment corresponding to the ADCP, the ADCP chassis having a bottom opening through which ADCP cabling of the ADCP runs inside the weldment.

19. The method of claim 11, further comprising:

detachably connecting a wiring access cover to the weldment to cover a wiring access opening disposed adjacent an end of the weldment, the wiring access cover being detachable from the weldment to allow access to wiring inside the weldment.

20. The method of claim 11, further comprising:

disposing a hydrophone chassis inside the weldment to support each hydrophone within the weldment, the hydrophone chassis comprising a tube having an open top end attached to an opening at the weldment top to expose a hydrophone sensor of the hydrophone and an open bottom end facing toward and spaced from an interior surface of the weldment bottom, the tube including a plurality of longitudinal slots spaced from each other between the open top end and the open bottom end.

* * * * *